US012634836B2

(12) United States Patent　　　　　(10) Patent No.: US 12,634,836 B2

Matsumura et al.　　　　　　　　　　(45) Date of Patent: May 19, 2026

(54) POWER HEADROOM REPORT MEDIUM ACCESS CONTROL-CONTROL ELEMENT FOR INDICATING POWER MANAGEMENT MAXIMUM POWER REDUCTION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 572 days.

(21) Appl. No.: 18/003,828

(22) PCT Filed: Jul. 10, 2020

(86) PCT No.: PCT/JP2020/027096
§ 371 (c)(1),
(2) Date: Dec. 29, 2022

(87) PCT Pub. No.: WO2022/009427
PCT Pub. Date: Jan. 13, 2022

(65) Prior Publication Data
US 2023/0292259 A1　　Sep. 14, 2023

(51) Int. Cl.
*H04W 52/36*　　　　　(2009.01)

(52) U.S. Cl.
CPC ....... *H04W 52/365* (2013.01); *H04W 52/367* (2013.01)

(58) Field of Classification Search
CPC ............. H04W 52/365; H04W 52/367; H04W 52/146; H04W 52/14; H04W 52/18; Y02D 30/70
See application file for complete search history.

(56) References Cited

U.S. PATENT DOCUMENTS

| | | | | |
|---|---|---|---|---|
| 2012/0207112 A1* | 8/2012 | Kim | ..................... | H04W 52/545 370/328 |
| 2015/0063275 A1* | 3/2015 | Yi | ........................ | H04W 52/365 370/329 |
| 2015/0189605 A1* | 7/2015 | Kim | ..................... | H04W 52/146 455/522 |
| 2015/0195795 A1* | 7/2015 | Loehr | ................. | H04W 52/365 455/522 |
| 2017/0223641 A1* | 8/2017 | Haim | ................... | H04W 52/365 |
| 2017/0303213 A1* | 10/2017 | Park | ....................... | H04W 72/04 |

(Continued)

OTHER PUBLICATIONS

Decision of refusal issued in Chinese Application No. 202080103781. 0, mailed on Oct. 23, 2024 (22 pages).

(Continued)

*Primary Examiner* — Ian N Moore

(74) *Attorney, Agent, or Firm* — Osha Bergman Watanabe & Burton LLP

(57) ABSTRACT

A terminal according to one aspect of the present disclosure includes: a transmission section that transmits a first medium access control-control element (MAC CE) including power-management maximum power reduction (PMPR) and a first value indicating an application timing of the PMPR; and a control section that controls transmission of an uplink (UL) signal based on the PMPR. According to one aspect of the present disclosure, it is possible to clarify applied PMPR.

4 Claims, 16 Drawing Sheets

(56) References Cited

U.S. PATENT DOCUMENTS

| | | | | |
|---|---|---|---|---|
| 2018/0139705 | A1* | 5/2018 | Takeda | H04W 72/0453 |
| 2019/0223116 | A1* | 7/2019 | Chen | H04W 24/10 |
| 2020/0145927 | A1* | 5/2020 | Sun | H04W 52/146 |
| 2023/0143727 | A1* | 5/2023 | Hakola | H04B 7/0404 |
| | | | | 455/522 |
| 2023/0156627 | A1* | 5/2023 | Yuan | H04W 52/365 |
| | | | | 370/318 |
| 2024/0056115 | A1* | 2/2024 | Zhou | H04W 52/365 |

OTHER PUBLICATIONS

Office Action issued in counterpart Chinese Application No. 202080103781.0, mailed Mar. 4, 2024 (19 pages).

ZTE: "Enhancement on FR2 Mpe mitigation", 3GPP TSG-RAN WG4 Meeting #94bis-e, R4-2003779, Electronic Meeting, Apr. 20-30, 2020 (3 pages).

International Search Report issued in Application No. PCT/JP2020/027096 mailed on Feb. 16, 2022 (3 pages).

Written Opinion issued in Application No. PCT/JP2020/027096 mailed on Feb. 16, 2022 (3 pages).

Apple, "P-MPR Reporting", 3GPP TSG-RAN WG2 Meeting #110-e, R2-2004778, Elbonia, Jun. 1-12, 2020 (4 pages).

Moderator (OPPO), "Email discussion summary for [94e Bis] [17] NR_RF_FR2_req_enh_Part_1", 3GPP TSG-RAN WG4 Meeting #94-e-Bis, R4-2005700, Electronic Meeting, Apr. 20-30, 2020 (41 pages).

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)", Mar. 2010 (149 pages).

Office Action issued in Chinese Application No. 202080103781.0, dated Jul. 16, 2024 (18 pages).

* cited by examiner

| R | R | PH (Type 1, PCell) |
|---|---|---|
| R | R | $P_{CMAX,f,c}$ |

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) | | | | | |
| R | R | $P_{CMAX,f,c}$ 1 | | | | | |
| P | V | PH (Type 1, PCell) | | | | | |
| R | R | $P_{CMAX,f,c}$ 2 | | | | | |
| P | V | PH (Type X, Serving Cell 1) | | | | | |
| R | R | $P_{CMAX,f,c}$ 3 | | | | | |

...

| P | V | PH (Type X, Serving Cell n) |
|---|---|---|
| R | R | $P_{CMAX,f,c}$ m |

Single
entry

Single
entry

Single
entry

Single
entry

Single
entry

Single
entry

Single entry

POWER HEADROOM REPORT MEDIUM ACCESS CONTROL-CONTROL ELEMENT FOR INDICATING POWER MANAGEMENT MAXIMUM POWER REDUCTION

TECHNICAL FIELD

The present disclosure relates to a terminal, a radio communication method, and a base station in a next-generation mobile communication system.

BACKGROUND ART

In a universal mobile telecommunications system (UMTS) network, specifications of long term evolution (LTE) have been drafted for the purpose of further increasing data rates, providing low latency, and the like (Non Patent Literature 1). Further, the specifications of LTE-Advanced (third generation partnership project (3GPP) Rel. 10 to 14) have been drafted for the purpose of further increasing capacity and advancement of LTE (3GPP Rel. 8 and 9)

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In NR, a measure for the problem of maximum permitted exposure (MPE) has been studied. UEs are required to meet a Federal Communication Commission (FCC) regulation on maximum radiation to human bodies for health and safety.

To deal with the MPE problem, reporting power-management maximum power reduction (PMPR) by a medium access control-control element (MAC CE) is considered. UE maximum output power ($P_{CMAX}$) is calculated using the PMPR. In a case where the PMPR applied to $P_{CMAX}$ is unclear, there is a possibility that $P_{CMAX}$ is not properly calculated.

Therefore, an object of the present disclosure is to provide a terminal, a radio communication method, and a base station capable of clarifying applied PMPR.

Solution to Problem

A terminal according to one aspect of the present disclosure includes: a transmission section that transmits a first medium access control-control element (MAC CE) including power-management maximum power reduction (PMPR) and a first value indicating an application timing of the PMPR; and a control section that controls transmission of an uplink (UL) signal based on the PMPR.

Advantageous Effects of Invention

According to one aspect of the present disclosure, it is possible to clarify applied PMPR.

DESCRIPTION OF EMBODIMENTS

Figures 1A, 1B:
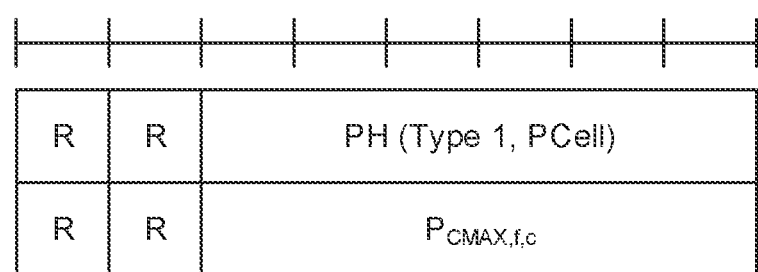
FIGS. 1A and 1B are diagrams illustrating an example of a power headroom report (PHR) medium access control-control element (MAC CE).

In NR, a measure for the problem of maximum permitted exposure (MPE) (or electromagnetic power density exposure) has been studied. UEs are required to meet a Federal Communication Commission (FCC) regulation on maximum radiation to human bodies for health and safety. For example, in NR Rel. 15, the following limiting method is defined as a regulation for limiting the exposure.

\<Limiting Method\>

As a limiting method, a limitation using power-management maximum power reduction (P-MPR) (maximum allowable UE output power reduction) is defined. For example, user equipment (UE) maximum output power $P_{cmax,f,c}$ is set in such a way that corresponding $P_{UMAX,f,c}$ (measured maximum output power or measured set UE maximum output power) satisfies the following Formula (1).

$$P_{Powerclass} - MAX(MAX(MPR_{f,c}, A\text{-}MPR_{f,c}) + \Delta MB_{P,n},$$
$$P\text{-}MPR_{f,c}) - MAX\{T(MAX(MPR_{f,c}, A\text{-}MPR_{f,c})), T$$
$$(P\text{-}MPR_{f,c})\} \leq P_{UMAX,f,c} \leq EIRP_{max} \tag{1}$$

It is assumed that $EIRP_{max}$ is the maximum value of corresponding measured peak equivalent isotopically radiated power (EIRP). It is assumed that $P\text{-}MPR_{f,c}$ is a value indicating reduction of the maximum output power allowed for a carrier f of a serving cell c. P-MPR$_{f,c}$ is introduced into the formula of the configured UE maximum output power P$_{cmax,f,c}$ of the carrier f of the serving cell c. This allows a UE to report available maximum output transmit power to a base station (e.g., gNB). This report can be used by the base station to determine scheduling. P-MPR$_{f,c}$ may be used to ensure compliance with available electromagnetic energy absorption requirements in a case of simultaneous transmission over a plurality of radio access technologies (RATs) for scenarios that are not within the scope of 3GPP RAN use, and to cope with unnecessary radiation/self-protection requirements, or may be used to ensure compliance with available electromagnetic energy absorption requirements in a case where proximity detection is used to cope with requirements such as requiring lower maximum output power.

<Report Regarding MPE>

It has been studied to prompt a UE equipped with a plurality of panels to select a UL Tx beam based on UL beam indication in consideration of a UL coverage loss due to the MPE, for fast UL panel selection.

However, how to speed up the beam/panel selection based on the MPE and how to inform a NW of the selection to avoid blind detection by the network are problematic. If the beam/panel selection based on the MPE is not performed at a high speed, deterioration in system performance such as a decrease in throughput may be caused. In addition, in a case where the UE voluntarily changes the UL Tx beam, and the network does not know the changed UL Tx beam, the network performs blind detection to determine the UL reception beam, which may cause deterioration in system performance, such as a decrease in throughput.

Therefore, it is conceivable that the UE reports that the uplink Tx beam does not satisfy a maximum permitted exposure (MPE) requirement.

In a case where the UE is configured to perform reporting triggered by the UE (e.g., by RRC layer signaling) for the MPE problem and the UE detects the MPE problem for the indicated UL beam, the UE may report the occurrence of the MPE problem. In the present disclosure, the MPE problem, the MPE failure, not satisfying the MPE requirement, and not meeting the MPE requirement may be replaced with one another. In the present disclosure, the MPE safe, the MPE adaptation, nonoccurrence of the MPE problem, nonoccurrence of the MPE failure, satisfying the MPE requirement, and meeting the MPE requirement may be replaced with one another. In the present disclosure, a report of occurrence of the MPE problem, a report of the MPE problem, and a request for solving (resolution) of the MPE problem may be replaced with one another.

The UE may detect (determine) the MPE problem in a case where the UL Tx beam or reference signal (RS) indicated for UL transmission (e.g., a PUSCH) does not satisfy the MPE requirement (in a case where a power parameter for the indicated UL Tx beam does not satisfy the MPE requirement). The indication of the UL Tx beam may be an SRS resource indicator (SRI) indicating a sounding reference signal (SRS) resource for a PUSCH, or may be spatial relation information or a transmission configuration indicator (TCI) state or a quasi co-location (QCL) assumption for at least one of a PUCCH, a PUSCH, an SRS, or a PRACH.

The MPE requirement may be at least one of the following.

P-MPR$_{f,c}$ required in consideration of the MPE is larger than a P-MPR threshold.

P$_{cmax,f,c}$ (maximum output power configured for the UE with respect to a carrier f of the serving cell c) calculated in consideration of the MPE is smaller than a P$_{CMAX}$ threshold.

A power headroom (PH) value (e.g., a real PH or a virtual PH) calculated in consideration of the MPE is smaller than a PH threshold.

At least one of the P-MPR threshold, the P$_{CMAX}$ threshold, or the PH threshold may be defined or set in advance.

The UE may report the occurrence of the MPE problem in response to the detection of the MPE problem.

The UE may determine the UL Tx beam/panel that satisfies the MPE requirement in response to the detection of the occurrence of the MPE problem. In the present disclosure, the UL Tx beam/panel, an MPE-adapted beam/panel, an MPE safe beam/panel, a candidate beam/panel, and a new UL Tx beam/panel that satisfies the MPE requirement may be replaced with each other. In the present disclosure, an MPE-adapted beam/panel report, an MPE-adapted beam/panel list, and a UL Tx beam/panel change plan may be replaced with each other.

The UE may report at least one determined MPE-adapted beam/panel.

<New MAC CE>

A new medium access control-control element (MAC CE) with a new logical channel ID (LCID) may be defined for reporting of at least one of the occurrence of the MPE problem or information regarding the beam/panel that satisfies the MPE requirement for one or more cells and bandwidth parts (BWPs) (MPE-adapted beams/panels). The new MAC CE may indicate at least one of a new UL Tx beam/panel or a cell in which the MPE problem occurs.

The new MAC CE may include at least one of the following Contents 1 to 8.

[Content 1]

A 0-bit or 1-bit field for indicating the MPE problem for each cell/BWP The MAC CE may include a field for one or more cells/BWPs. The MAC CE may include a cell/BWP index.

[Content 2]

One or more or up to N MPE-adapted beam/panel indexes for one cell/BWP in which the MPE problem is detected.

[Content 3]

An index of the MPE-adapted beam/panel for a plurality of cells/BWPs in which the MPE problem is detected. The MAC CE may include one or more or up to N MPE-adapted beam/panel indexes for each of the plurality of cells/BWPs.

[Content 4]

Required P-MPR for each beam/panel index in addition to at least one of Contents 1, 2, and 3.

[Content 5]

Remaining power estimated in consideration of the P-MPR (remaining power estimated in consideration of the MPE) for each beam/panel index in addition to at least one of Contents 1, 2, and 3. The estimated remaining power may be a PH value based on actual transmission or a reference format (virtual transmission) in consideration of the MPE, or may be a power headroom report (PHR) in consideration of the MPE for each beam. The PHR may include a content (at least one of a PH type, a PH value, or P$_{cmax,f,c}$) in the PHR MAC CE.

[Content 6]

Calculated P$_{cmax,f,c}$ for each beam/panel index in addition to at least one of Contents 1, 2, and 3

[Content 7]

Two or more combinations of Contents 1 to 6.

[Content 8]

A field (bit) indicating that no MPE-adapted beam/panel is found for a cell/BWP based on Content 7.

<PHR MAC CE>

As the PHR MAC CE, a single-entry PHR MAC CE and a multiple-entry PHR MAC CE are considered. The single-entry PHR MAC CE indicates the PH and $P_{CMAX}$ of a single serving cell. The multiple-entry PHR MAC CE indicates the PHs and $P_{CMAX}$ of a plurality of serving cells.

FIG. 1A illustrates an example of the single-entry PHR MAC CE. "R" in FIG. 1 is a reserved bit, and for example, 0 is set. "PH" is a 6-bit field indicating a PH level. "$P_{cmax,f,c}$" is used for calculation of the PH (in the same MAC CE) in an NR serving cell. "$P_{cmax,f,c}$" may correspond to a nominal transmit power level, and each value of "$P_{cmax,f,c}$" may indicate a specific range of power [dbm]. $P_{CMAX,C}$ used to calculate a PH field (in the same MAC CE) in evolved universal terrestrial radio access (E-UTRA) may be included.

FIG. 1B illustrates an example of the multiple-entry PHR MAC CE. "P" in FIG. 1A is a field indicating whether or not an MAC entity applies power backoff (reduction) by power management. That is, "P" indicates whether or not the P-MPR is applied. In a case where the value of the corresponding $P_{cmax,f,c}$ field is different, and the power backoff by power management is not applied, the MAC entity may set P to 1. In an example in which the MAC CE does not include the P-MPR as in FIGS. 1A and 1B, the P-MPR is a fixed value, and no value is reported.

"$C_i$" indicates whether or not a PH field of a serving cell having a serving cell index i exists. In the example of FIG. 1B, i=1 to 7. "V" is a field indicating whether the PH value is based on actual transmission or the reference format. V may indicate whether or not $P_{CMAX}$ exists.

Note that, in the other drawings illustrating the PHR MAC CE, the contents of PH, $P_{cmax,f,c}$, V, P, and $C_i$ are assumed to be the same as the contents in FIGS. 1A and 1B described above unless otherwise specified.

The $P_{CMAX}$ value is calculated using the PMPR. However, in a case where reporting the PMPR before or after the PMPR is applied depends on UE implementation, the $P_{CMAX}$ value may be unclear. For example, in a case where the PMPR is reported by an extended PHR MAC CE together with $P_{CMAX}$, and the PMPR is already applied at the time of reporting, the reported PMPR is applied to calculation of reported $P_{CMAX}$. On the other hand, in a case where the PMPR is not yet applied at the time of reporting, the $P_{CMAX}$ value at the time of reporting is different from the $P_{CMAX}$ value after reporting (after application of the PMPR). In a case where an application timing of the PMPR is not appropriately set, there is a possibility that $P_{CMAX}$ is not appropriately calculated. For proper UL scheduling, it is preferable that a relationship between $P_{CMAX}$ of the PHR and the applied PMPR is clear.

In this regard, the present inventors have conceived a UE including: a transmission section that transmits a first medium access control-control element (MAC CE) including power-management maximum power reduction (PMPR) and a first value indicating an application timing of the PMPR; and a control section that controls transmission of an uplink (UL) signal based on the PMPR. According to one aspect of the present disclosure, it is possible to clarify PMPR applied to calculation of $P_{CMAX}$.

Hereinafter, embodiments according to the present disclosure will be described in detail with reference to the drawings. Radio communication methods according to the respective embodiments may be applied independently, or may be applied in combination.

Each embodiment may be applied to at least one frequency range (FR). At least one FR may be FR2, or may be FR1 and FR2.

In the present disclosure, a duty ratio or maximum uplink duty ratio is described assuming that the duty ratio or maximum uplink duty ratio means the maximum uplink duty ratio in FR2 (maxUplinkDutyCycle-FR2), but is not limited thereto. The duty ratio may be replaced with a duty ratio in another FR (e.g., FR4).

In the present disclosure, "A/B" and "at least one of A or B" may be interchangeable.

In the present disclosure, a beam, a panel, a UE panel, and an antenna panel may be replaced with each other. In addition, a beam index, a panel index, and a beam index and a panel index may be replaced with each other. The beam index may include the panel index, or the beam index and the panel index may be indicated separately.

The beam index may be an RS resource index, an RS index, a synchronization signal block (SSB) index, a channel state information reference signal (CSI-RS), or an SRS index. A panel index, an RS resource group (RS resource set) index, an RS group (RS set) index, an antenna port (antenna port group, or antenna port set) index, and an antenna assumption (mode) index may be replaced with each other. An index and an ID may be replaced with each other.

The reporting in the present disclosure may be performed by higher layer signaling. Here, the higher layer signaling is, for example, radio resource control (RRC) signaling, broadcast information (master information block (MIB), system information block (SIB), or the like), medium access control (MAC) signaling, or the like.

In the present disclosure, the MPE requirement and the FCC regulation on the MPE may be replaced with each other.

In the present disclosure, UL transmission, a PUSCH, a PUCCH, and an SRS may be replaced with each other.

In the present disclosure, A larger than B, and A equal to or larger than B may be replaced with each other. In the present disclosure, A smaller than B, and A equal to or smaller than B may be replaced with each other.

In the present disclosure, a cell and a CC may be replaced with each other.

In the present disclosure, excess transmit power (power headroom (PH)) and an excess transmit power report (power headroom report (PHR)) may be replaced with each other. In the present disclosure, a real PH and a PH based on actual transmission may be replaced with each other. In the present disclosure, a virtual PH, a PH based on the reference format, and a PH based on reference transmission may be replaced with each other.

Note that in the present disclosure, the higher layer signaling may be, for example, any one of radio resource control (RRC) signaling, medium access control (MAC) signaling, broadcast information, or a combination thereof.

For example, a MAC control element (MAC CE), a MAC protocol data unit (PDU), or the like may be used for the MAC signaling. The broadcast information may be, for example, a master information block (MIB), a system information block (SIB), remaining minimum system information (RMSI), other system information (OSI), or the like.

The P-MPR, P-MPR$_{f,c}$, and the PMPR may be replaced with each other. $P_{CMAX}$ and $P_{CMAX,f,c}$ may be replaced with each other. "PMPR is applied to $P_{CMAX}$" and "PMPR is used to calculate $P_{CMAX}$" may be replaced with each other. A PHR MAC CE and an MAC CE may be replaced with each other.

The same MAC CE and the same entry may be replaced with each other. In the present disclosure, the PMPR in each of the following embodiments may be variable.

In the present disclosure, "before . . . " and "before or at the same time as . . . " may be replaced with each other. "after . . . " and "after or at the same time as . . . " may be replaced with each other.

(Radio Communication Method)

First Embodiment

The UE transmits a medium access control-control element (MAC CE) (first MAC CE) including power-management maximum power reduction (PMPR) and controls transmission of an uplink (UL) signal based on the PMPR. The MAC CE may include a first value (e.g., "A" to be described later) indicating an application timing of the PMPR (power backoff based on the PMPR), or the application timing of PMPR may be defined in the specification. In the first embodiment, the single-entry PHR MAC CE (an MAC CE including a power headroom) is used as the MAC CE.

Figure 2A:
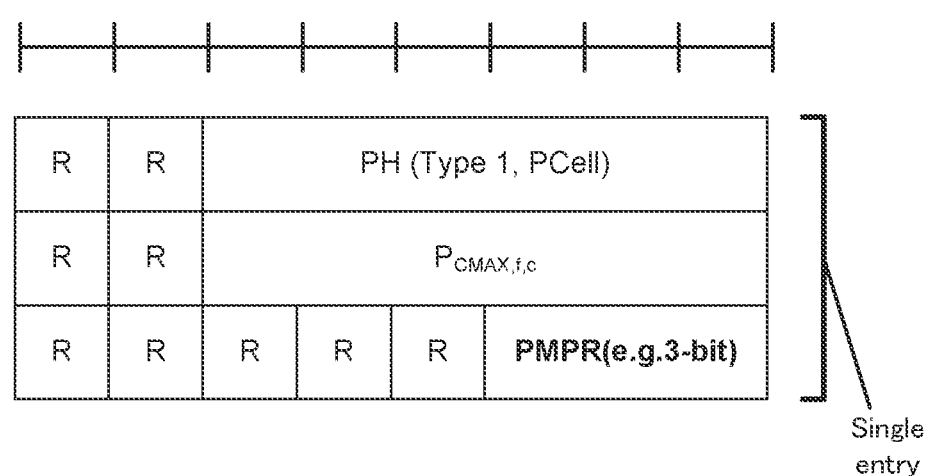
FIGS. 2A and 2B are diagrams illustrating PHR MAC CEs of Option 1-1 and Option 1-2, respectively.
Figure 2B:
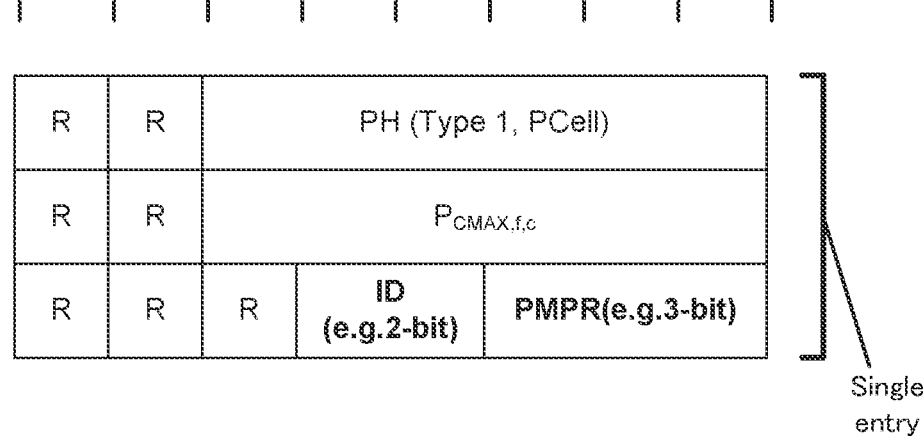

FIGS. 2A and 2B are diagrams illustrating PHR MAC CEs of Option 1-1 and Option 1-2, respectively. FIGS. 2A and 2B include the PH, $P_{CMAX}$, and the PMPR. FIG. 2B further includes an ID. The PH and $P_{CMAX}$ are 6 bits, the ID is 2 bits, and the PMPR is 3 bits, but the PH, $P_{CMAX}$, the PMPR, and the ID are not limited to these bit values. The PH corresponds to Type 1 and a PCell, but may also correspond to another type or another cell (e.g., SCell).

In a case where a PMPR report is specific to a beam/beam group/panel/panel group, as illustrated in FIG. 2B, an ID for identifying the beam/beam group/panel/panel group may be included in the MAC CE. For the ID, the same applies to Option 1-3.

In a case where the PH, $P_{CMAX}$, the PMPR, and the ID are not specifically described, other drawings illustrating the PHR MAC CE are similar to FIGS. 2A and 2B.

[Option 1-1]

The PMPR (reported PMPR or PMPR in the MAC CE) is used for calculation of $P_{CMAX}$ in the same MAC CE. It may be defined in the specification that the PMPR is already applied to the calculation of $P_{CMAX}$ in the same MAC CE.

[Option 1-2]

It may be defined in the specification that the PMPR is applied after a specific period (e.g., after X symbols/slots/ms) from the PMPR reporting. In this case, $P_{CMAX}$ of the MAC CE has not considered the PMPR yet. A PMPR field in the MAC CE may indicate that the PMPR is applied after the PMPR reporting.

Figure 3:
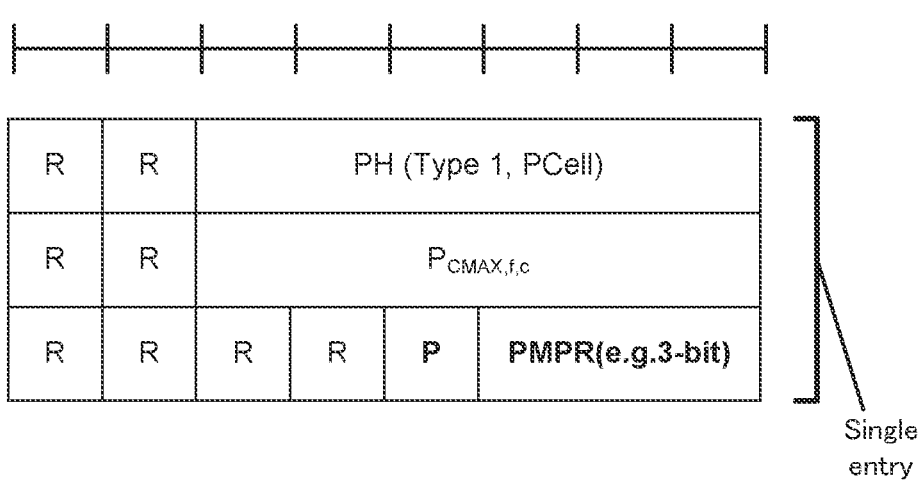
FIG. 3 is a diagram illustrating an example in which "P" is added to the PHR MAC CE of FIG. 2A.

For example, the latest PMPR report prior to the current PMPR report may be applied to the calculation of $P_{CMAX}$ (reported $P_{CMAX}$ or current $P_{CMAX}$). Alternatively, the PMPR does not have to be applied to $P_{CMAX}$. Alternatively, as illustrated in FIG. 3, "P" may be added to the single-entry PHR MAC CE (FIG. 2A) indicating whether or not the PMPR is applied. As the field of "P", a specific field among a plurality of "R" may be used. As illustrated in FIG. 2B, "P" may be added to an example including the ID.

[Option 1-3]

Figure 4A:
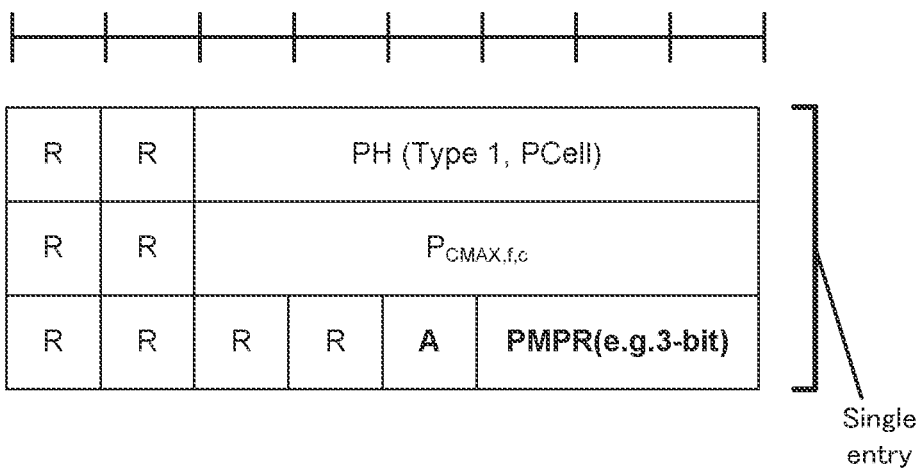
FIGS. 4A and 4B are diagrams illustrating PHR MAC CEs of Option 1-3.
Figure 4B:
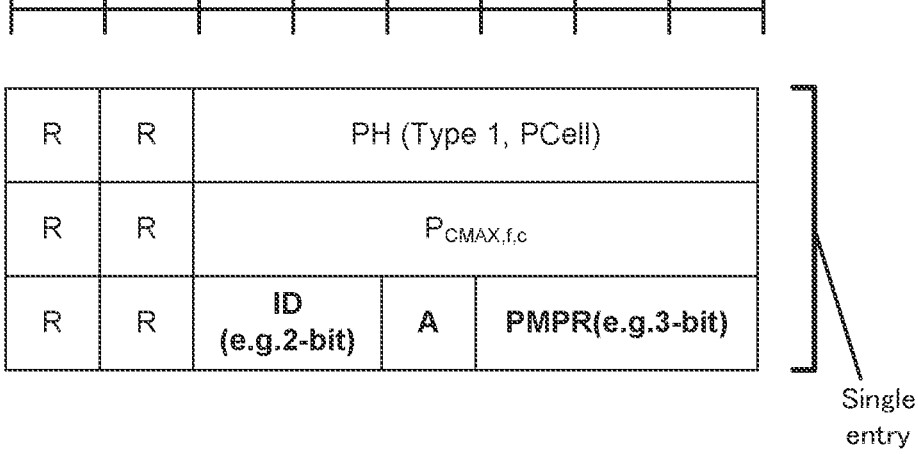

FIGS. 4A and 4B are diagrams illustrating a PHR MAC CE of Option 1-3. FIGS. 4A and 4B are different from FIGS. 2A and 2B in that "A" is included. "A" indicates whether the PMPR in the MAC CE is already applied to $P_{CMAX}$ in the same MAC CE, or is applied after the PMPR reporting (MAC CE transmission). "A" may be set for each beam/beam group/panel/panel group. In a case where "A" is set to 1 (or 0), "A" indicates that the PMPR is already applied to $P_{CMAX}$ in the same MAC CE. Otherwise (e.g., in a case where "A" is set to 0 (or 1)), "A" indicates that the PMPR is applied after the PMPR reporting. That is, whether to apply Option 1-1 or Option 1-2 is switched by "A".

In the present disclosure, a specific field among a plurality of "R" may be used as the field of "A". In addition, other characters may be applied instead of "A".

In a case where "A" is not set to 1 (or 0) (e.g., "A" is set to 0 (or 1)), the latest report prior to the current report may be applied to the calculation of $P_{CMAX}$, or the PMPR does not have to be applied to $P_{CMAX}$.

Figure 5:
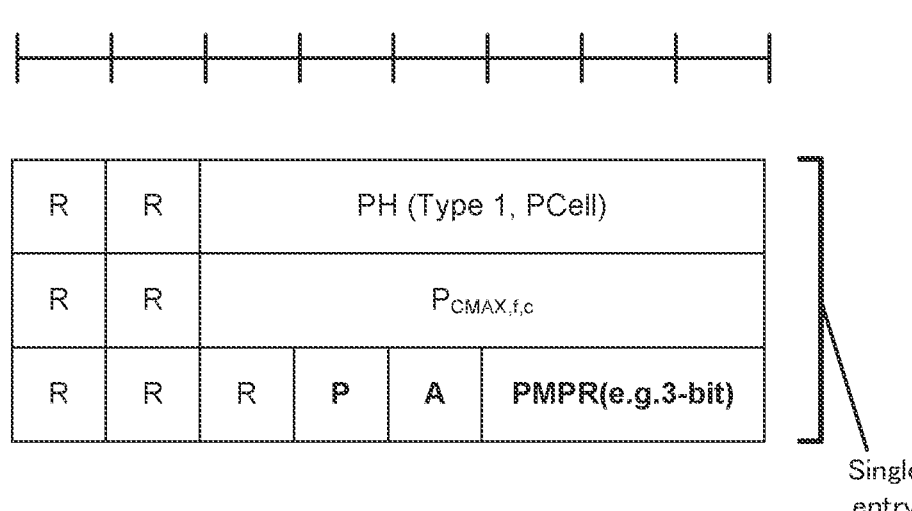
FIG. 5 is a diagram illustrating an example in which "P" is added to the PHR MAC CE of FIG. 4A.

FIG. 5 is a diagram illustrating an example in which "P" is added to the PHR MAC CE of Option 1-3 (FIG. 4A). As illustrated in FIG. 5, "P" indicating whether or not the PMPR is applied to $P_{CMAX}$ may be included in the PHR MAC CE.

[Option 1-4]

For the UE, which of Options 1-1 and 1-2 is applied may be set by the network by higher layer signaling (e.g., RRC).

[Option 1-5]

The UE may report (by UE capability information) which of Options 1-1 and 1-2 is supported. The UE may assume that the reported option is applied.

According to the first embodiment, the UE can appropriately set the application timing of the PMPR by using the single-entry PHR MAC CE.

Second Embodiment

The UE transmits a MAC CE (first MAC CE) including PMPR, and controls transmission of an uplink (UL) signal based on the PMPR. The MAC CE may include a first value (e.g., "A" to be described later) indicating an application timing of the PMPR, or the application timing of the PMPR may be defined in the specification. In the second embodiment, the multiple-entry (multi-entry) PHR MAC CE (an MAC CE including a power headroom) is used as the MAC CE.

Figure 6:
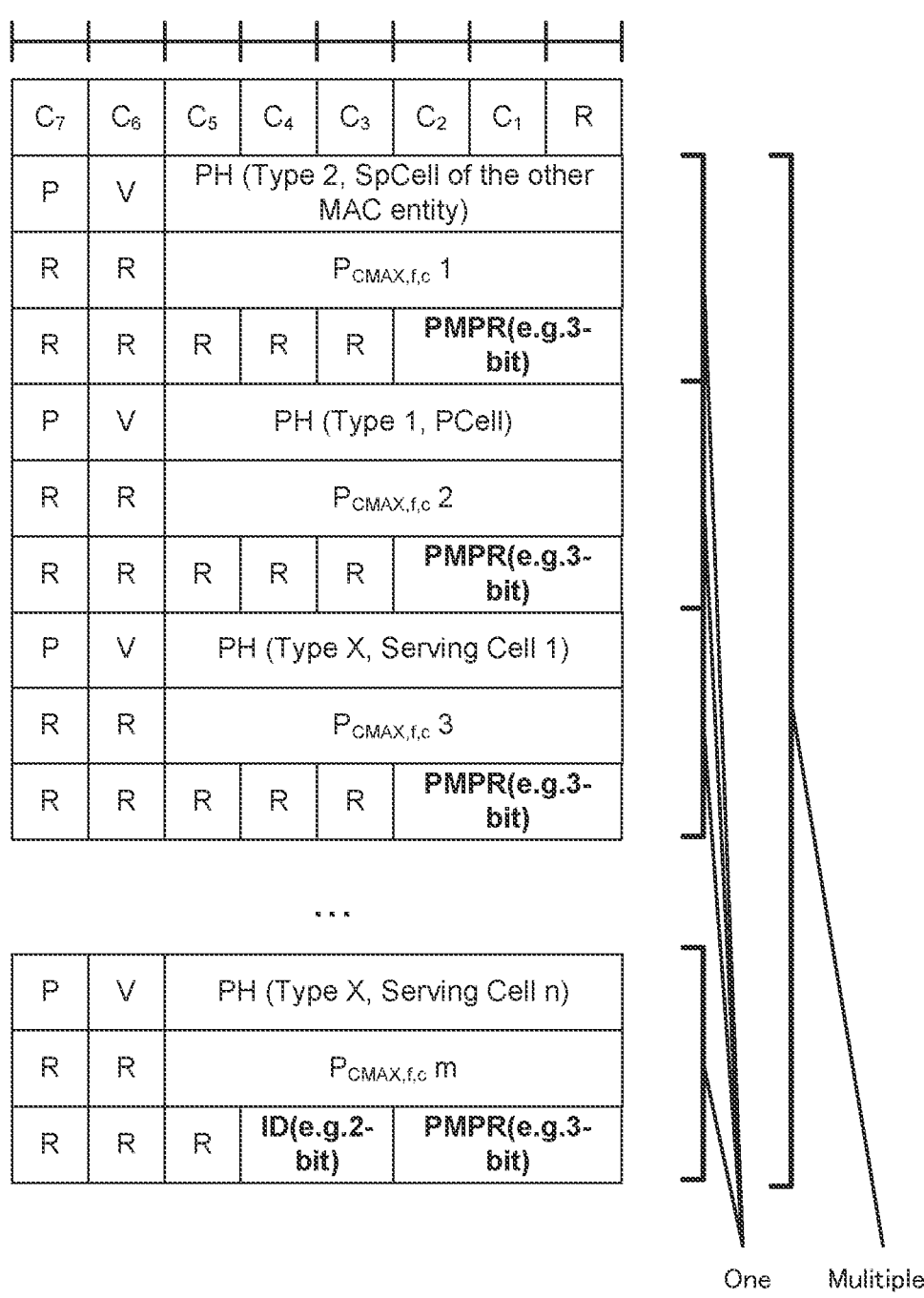
FIG. 6 is a diagram illustrating PHR MAC CEs of Option 2-1 and Option 2-2.

FIG. 6 is a diagram illustrating PHR MAC CEs of Option 2-1 and Option 2-2. In the PHR MAC CEs illustrated in FIG. 6, there are multiple entries including the PMPR field.

[Option 2-1]

It may be defined in the specification that the PMPR is applied after X symbols/slot/ms from the PMPR reporting.

In a case where "P" is set to 1, the latest report before the current PMPR report may be applied to the calculation of $P_{CMAX}$.

[Option 2-2]

Figure 7:
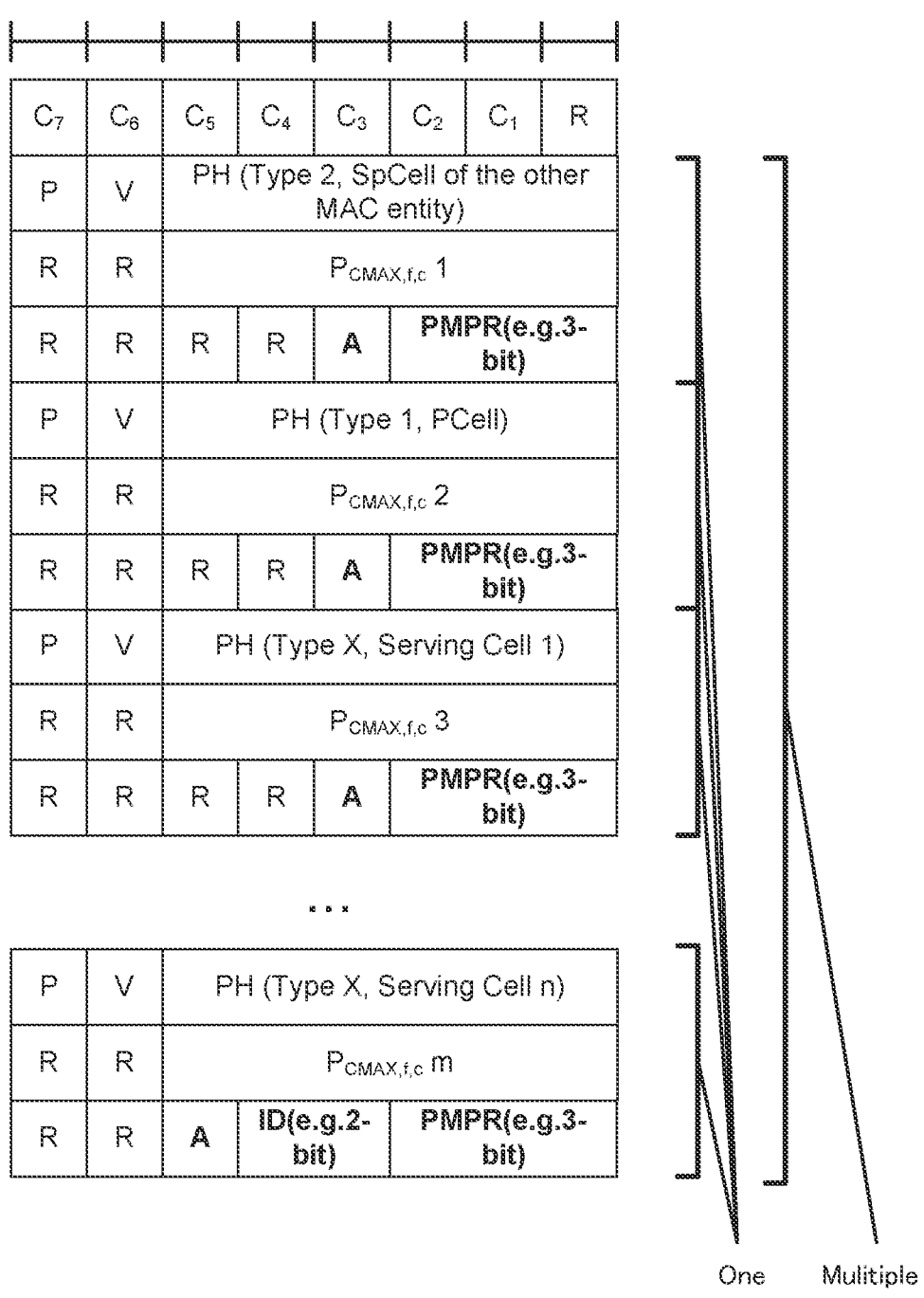
FIG. 7 is a diagram illustrating a PHR MAC CE of Option 2-3.

"P" illustrated in FIG. 7 indicates whether or not the PMPR is applied to $P_{CMAX}$ in the same MAC CE (in the same entry). In a case where "P" is set to 1 (or 0), "P" may indicate that the PMPR is applied to $P_{CMAX}$ in the same MAC CE. In a case where "P" is not set to 1 (or 0) (in a case where "P" is set to 0 (or 1)), "P" may indicate that the PMPR is applied after the PMPR reporting. That is, "P" in Option 2-2 has a similar function to that of "A" in Option 1-3.

In a case where "P" is set to 1, the PMPR may be used for the calculation of $P_{CMAX}$ in the same MAC CE.

[Option 2-3]

FIG. 7 is a diagram illustrating a PHR MAC CE of Option 2-3. FIG. 7 is different from FIG. 6 in that one "R" in each entry is replaced with "A". "A" has a similar function to that of "A" of Option 1-3. "P" indicates whether or not the PMPR is applied to $P_{CMAX}$ in the same MAC CE. "A"/"P" may be set for each beam/beam group/panel/panel group.

In a case where "A" is set to 1 (or 0), "A" may indicate that the PMPR is already applied to $P_{CMAX}$ in the same MAC CE. Otherwise (e.g., in a case where "A" is set to 0 (or 1)), "A" may indicate that the PMPR is applied after the PMPR reporting. "A" may be set to 1 only in a case where "P" is set to 1 (or 0). In a case where "P" is set to 0 (or 1), "A" may be ignored.

In a case where "P" is set to 1 (or 0) and "A" is set to 1 (or 0), the PMPR may be used for the calculation of $P_{CMAX}$ in the same MAC CE. In a case where "P" is set to 1 (or 0) and "A" is set to 0 (or 1), the latest PMPR report prior to the current PMPR report may be applied to the calculation of $P_{CMAX}$.

[Option 2-4]

For the UE, which of Options 2-1 and 2-2 is applied may be set by the network by higher layer signaling (e.g., RRC).

[Option 2-5]

The UE may report (by UE capability information) which of Options 2-1 and 2-3 is supported. The UE may assume that the reported option is applied.

According to the second embodiment, the UE can appropriately set the application timing of the PMPR by using the multiple-entry PHR MAC CE.

Modifications

The PHR MAC CEs of the first and second embodiments may include the PMPR only when the PMPR is triggered by a PMPR reporting triggering event. For example, the PHR MAC CE may include the PMPR only in a case where the PMPR is higher than a preset threshold or in a case where the PMPR is changed to be higher than the preset threshold.

Modification of First Embodiment

Figure 8:
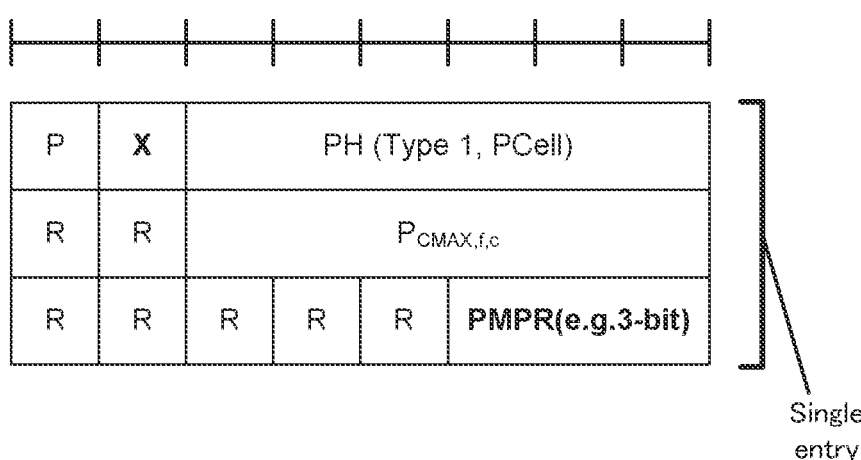
FIG. 8 is a diagram illustrating a PHR MAC CE in a first modification of a first embodiment.

FIG. 8 is a diagram illustrating a PHR MAC CE in a first modification of the first embodiment. "X" (second value) included in FIG. 8 may indicate whether or not the PMPR field exists in the PHR MAC CE.

For example, in a case where "X" is set to "1" (or "0"), "X" may indicate that the PMPR field exists (in the MAC CE). Otherwise (e.g., in a case where "X" is set to "0" (or "1"), the PMPR field may be omitted. In a case where the PMPR field exists, the processing in the first embodiment may be applied. In a case where the PMPR field does not exist, the latest PMPR report prior to the current PMPR report may be applied to the calculation of $P_{CMAX}$.

First Modification of Second Embodiment

"P" or "V" illustrated in FIG. 6 or 7 of the second embodiment may indicate whether or not the PMPR field exists. For example, in a case where "P" is set to "1" (or "0"), "P" may indicate that the PMPR field exists. Otherwise (e.g., in a case where "P" is set to "0" (or "1")), the PMPR field may be omitted. Alternatively, in a case where "V" is set to "1" (or "0"), "V" may indicate that the PMPR field exists. Otherwise (e.g., in a case where "V" is set to "0" (or "1")), the PMPR field may be omitted.

Second Modification of Second Embodiment

Figure 9:
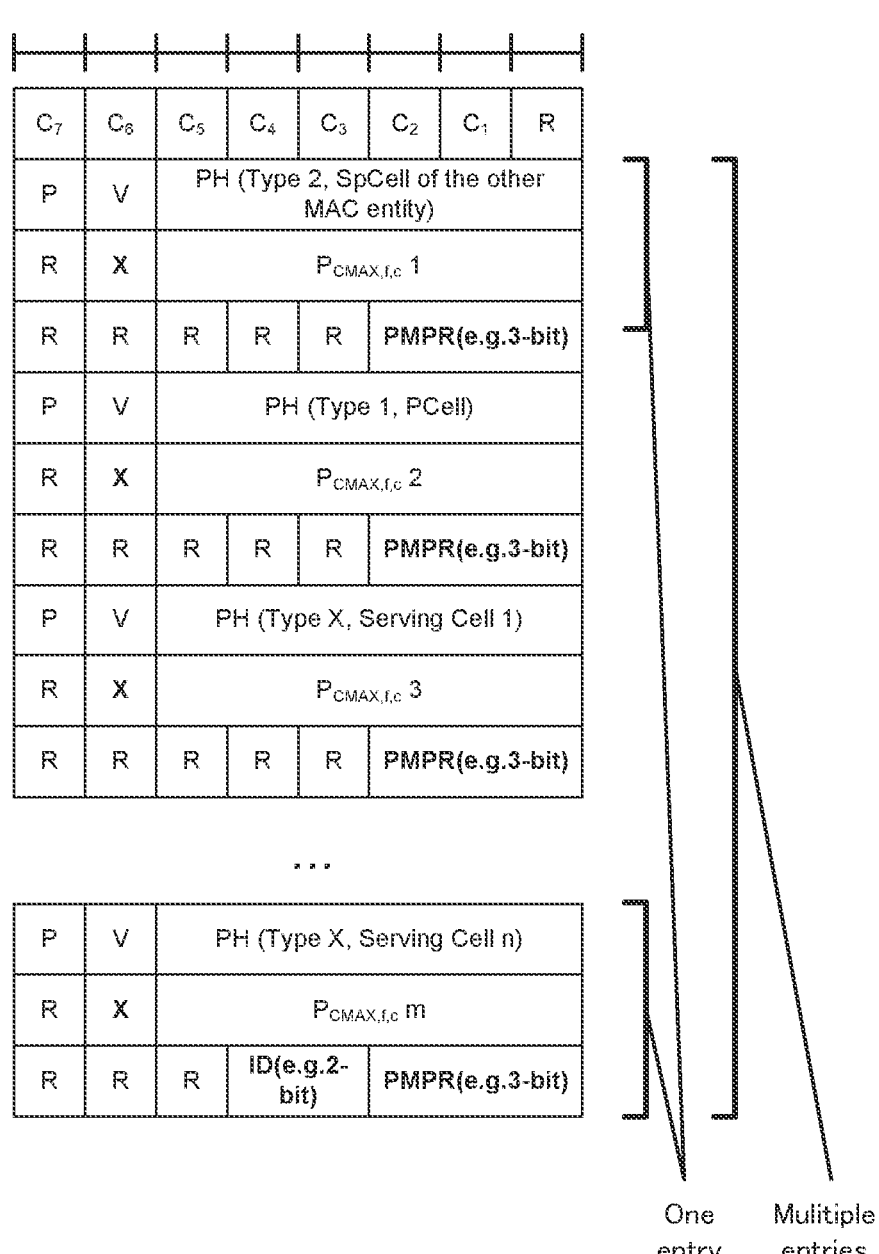
FIG. 9 is a diagram illustrating a PHR MAC CE in a second modification of a second embodiment.

FIG. 9 is a diagram illustrating a PHR MAC CE in a second modification of the second embodiment. FIG. 9 illustrates a PHR MAC CE in which one "R" in each entry in the example of FIG. 6 is replaced with "X" (second value). Alternatively, a PHR MAC CE in which one "R" in each entry in the example of FIG. 7 is replaced with "X" may be applied. The position of "X" is not limited to the position illustrated in FIG. 9, and may be another position of "R". The function of "X" is similar to that of "X" in the modification of the first embodiment (FIG. 8).

In a case where a PHR/PMPR report is specific to a beam/beam group/panel/panel group, an ID for identifying the beam/beam group/panel/panel group may be included in the MAC CE. "P", "V", and "X" may be set for each beam/beam group/panel/panel group.

Third Embodiment

The UE may report the PMPR with a new MAC CE (the first MAC CE without a power headroom) independent of (separate from) a PHR MAC CE (second MAC CE).

Figure 10:
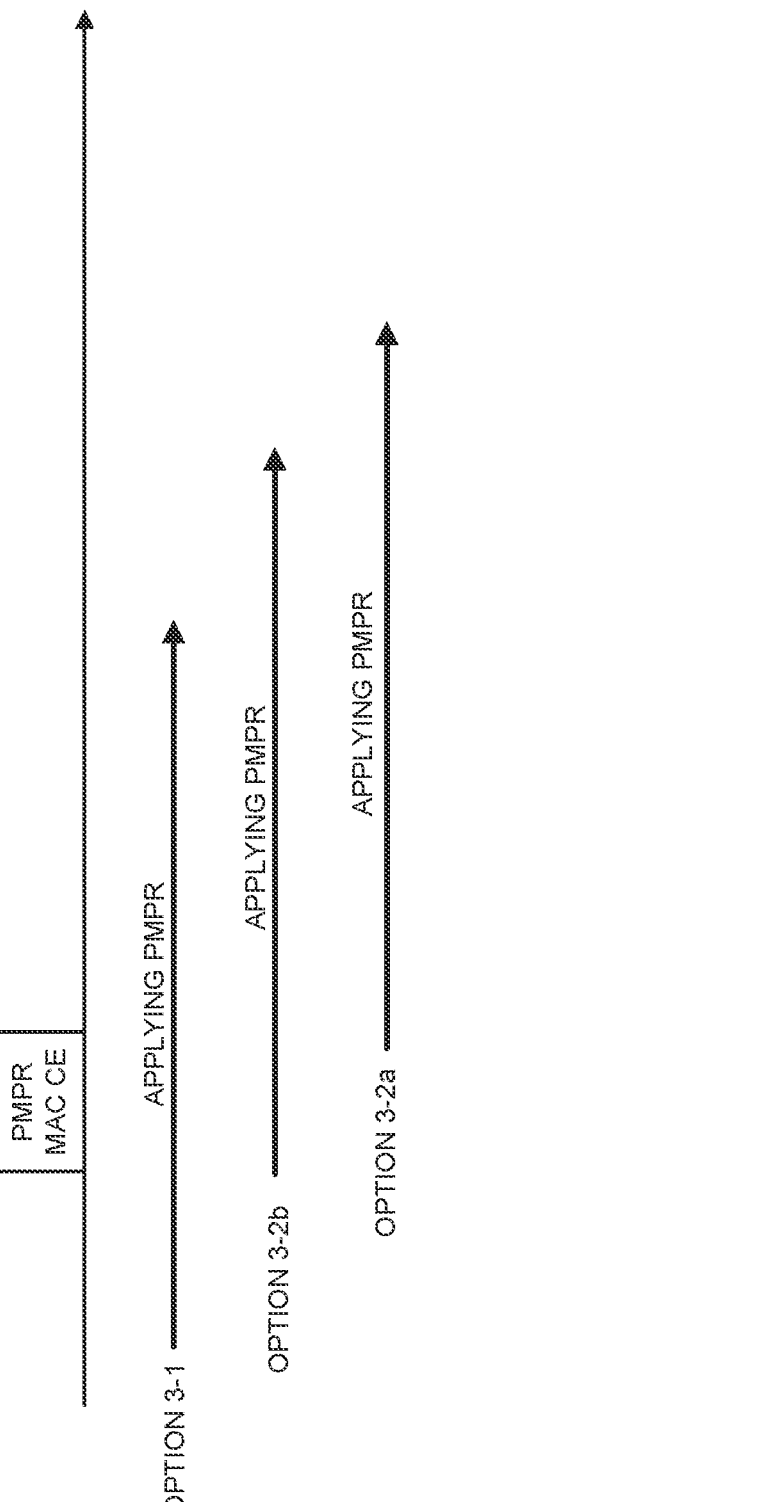
FIG. 10 is a diagram illustrating an application timing of power-management maximum power reduction (PMPR) in a third embodiment.

FIG. 10 is a diagram illustrating an application timing of the PMPR in the third embodiment. A "PMPR MAC CE" indicates a new MAC CE that includes the PMPR and is independent of the PHR MAC CE. Options corresponding to FIG. 10 will be described below.

[Option 3-1]

It may be defined in the specification that the PMPR is already applied before the PMPR reporting.

[Option 3-2a]

It may be defined in the specification that the PMPR is not applied before the PMPR reporting. The PMPR may be applied after a specific period (e.g., after X symbols/slot/ms) from the PMPR reporting.

[Option 3-2b]

It may be defined in the specification that the PMPR is not applied before the PMPR reporting. The PMPR may be applied after (or at the same time as) the PMPR reporting.

[Option 3-3]

The new MAC CE may include a field "A" indicating which of Option 3-1 and Option 3-2a/3-2b is applied. For example, in a case where "A" is set to 1 (or 0), the PMPR is applied before the PMPR reporting (Option 3-1). Otherwise (e.g., in a case where "A" is set to 0 (or 1)), the PMPR is not applied before the PMPR reporting, but after or at the same time as the PMPR reporting (Option 3-2a/3-2b).

In a case where the PMPR report is specific to a beam/ beam group/panel/panel group, an ID for identifying the beam/beam group/panel/panel group may be included in the new MAC CE. "A" may be set for each beam/beam group/ panel/panel group.

$P_{CMAX}$ may be included in a single-entry PHR (PHR MAC CE). In this case, the following Options 4-0 to 4-3 are applied. Hereinafter, the PHR may be replaced with the PHR MAC CE.

[Option 4-0]

A relationship between the reported PMPR and $P_{CMAX}$ does not have to be defined in the specification. Real-time PMPR may be applied to $P_{CMAX}$.

[Option 4-1]

It may be defined in the specification that the latest PMPR reported (transmitted) before the PHR (before PHR MAC CE transmission) or simultaneously with the PHR (simultaneously with PHR MAC CE transmission) is applied to the calculation of $P_{CMAX}$.

[Option 4-2]

It may be defined in the specification that the first PMPR reported (transmitted) after the PHR (after PHR MAC CE transmission) or simultaneously with the PHR (simultaneously with PHR MAC CE transmission) is applied to the calculation of $P_{CMAX}$.

[Option 4-3]

The PHR MAC CE may include a field "A" (third value) indicating which of Option 4-1 and Option 4-2 is applied.

Note that the new MAC CE may include this "A". For example, in a case where "A" is set to 1 (or 0), "A" may indicate that Option 4-1 is applied, and otherwise (e.g., in a case where "A" is set to 0 (or 1)), "A" may indicate that Option 4-2 is applied. That is, "A" indicates which of the PMPR transmitted before the PHR MAC CE transmission, the PMPR transmitted simultaneously with the PHR MAC CE transmission, and the PMPR transmitted after the PHR MAC CE transmission is applied.

$P_{CMAX}$ may be included in a multiple-entry PHR (PHR MAC CE). In this case, the following Options 5-0 to 5-3 are applied.

[Option 5-0]

A relationship between the reported PMPR and $P_{CMAX}$ does not have to be defined in the specification. In a case where "P" is set to 1 (or 0), real-time PMPR may be applied to $P_{CMAX}$.

[Option 5-1]

In a case where "P" of the PHR MAC CE is set to 1 (or 0), it may be defined in the specification that the latest PMPR reported (transmitted) before the PHR (before PHR MAC CE transmission) or simultaneously with the PHR (simultaneously with PHR MAC CE transmission) is applied to the calculation of $P_{CMAX}$.

[Option 5-2]

In a case where "P" of the PHR MAC CE is set to 1 (or 0), it may be defined in the specification that the first PMPR reported (transmitted) after the PHR (after PHR MAC CE transmission) or simultaneously with the PHR (simultaneously with PHR MAC CE transmission) is applied to the calculation of $P_{CMAX}$.

[Option 5-3]

The PHR MAC CE may include a field "A" (third value) indicating which of Option 5-1 and Option 5-2 is applied. Note that the new MAC CE may include this "A". For example, in a case where "P" is set to 1, and "A" is set to 1 (or 0), "A" may indicate that Option 5-1 is applied, and otherwise (e.g., in a case where "A" is set to 0 (or 1)), "A" may indicate that Option 5-2 is applied. That is, "A" indicates which of the PMPR transmitted before the PHR MAC CE transmission, the PMPR transmitted simultaneously with the PHR MAC CE transmission, and the PMPR transmitted after the PHR MAC CE transmission is applied.

In a case where the PMPR report is specific to a beam/beam group/panel/panel group, an ID for identifying the beam/beam group/panel/panel group may be included in the PHR MAC CE. "A" may be set for each beam/beam group/panel/panel group.

[PMPR Applied to $P_{CMAX}$ when Option 3-1 is Applied]

In a case where Option 3-1 is applied to the PMPR, the PMPR is already applied before the PMPR reporting. In a case where the PMPR MAC CE and the PHR (PHR MAC CE including $P_{CMAX}$) are transmitted on the same PUSCH, the PMPR reported simultaneously with the PHR (on the same PUSCH) is applied to the calculation of $P_{CMAX}$.

In a case where the PHR is between two PMPR reports, an application start time of the reported PMPR may be unclear. In this case, it is preferable to apply Option 4-3/5-3 to the determination of the PMPR to be applied to $P_{CMAX}$. That is, the PMPR to be applied is set using "A".

Figure 11:
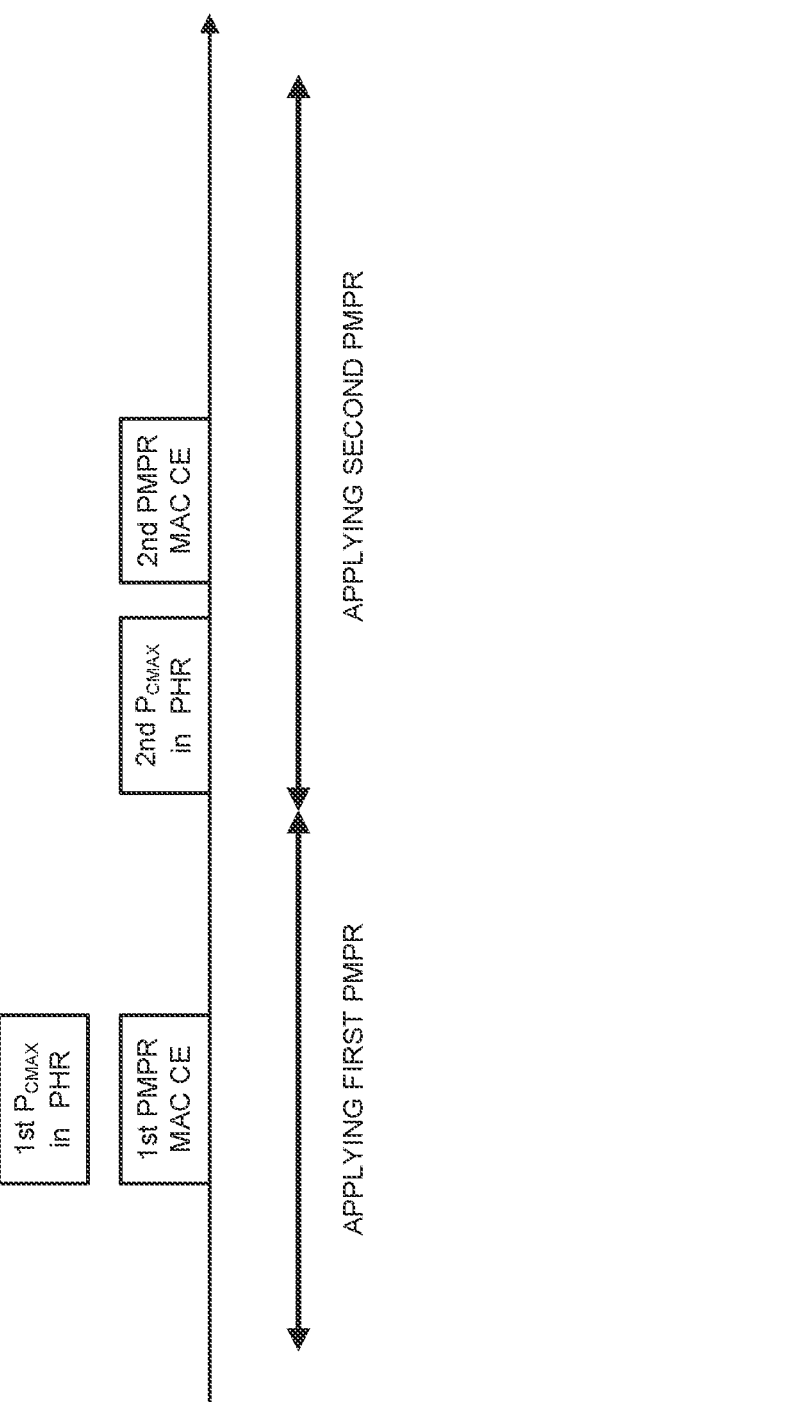
FIG. 11 is a diagram illustrating a first example in which the PMPR is applied to $P_{CMAX}$.

FIG. 11 is a diagram illustrating a first example in which the PMPR is applied to $P_{CMAX}$. In the example illustrated in FIG. 11, it is assumed that first PMRP is applied to first $P_{CMAX}$ and second PMRP is applied to second $P_{CMAX}$. In this case, it is sufficient if, for example, the UE sets "A" to 0 to indicate that the first PMPR (second PMRP) reported after (or simultaneously with) the PHR is applied to the calculation of $P_{CMAX}$ (Option 4-2/5-2). In addition, in a case of applying the first PMRP to the second $P_{CMAX}$, it is sufficient if, for example, the UE "A" to 1 to indicate that the latest PMPR (first PMRP) reported before (or simultaneously with) the PHR is applied to the calculation of $P_{CMAX}$ (Option 4-1/5-1).

[PMPR Applied to $P_{CMAX}$ when Option 3-2a/3-2b is Applied]

When Option 3-2a/3-2b is applied, it is preferable to apply Option 4-1/5-1. That is, since the PMPR is applied after (or simultaneously with) the PMPR reporting, it is preferable that the latest PMPR reported before (or simultaneously with) the PHR is applied to the calculation of $P_{CMAX}$.

Figure 12:
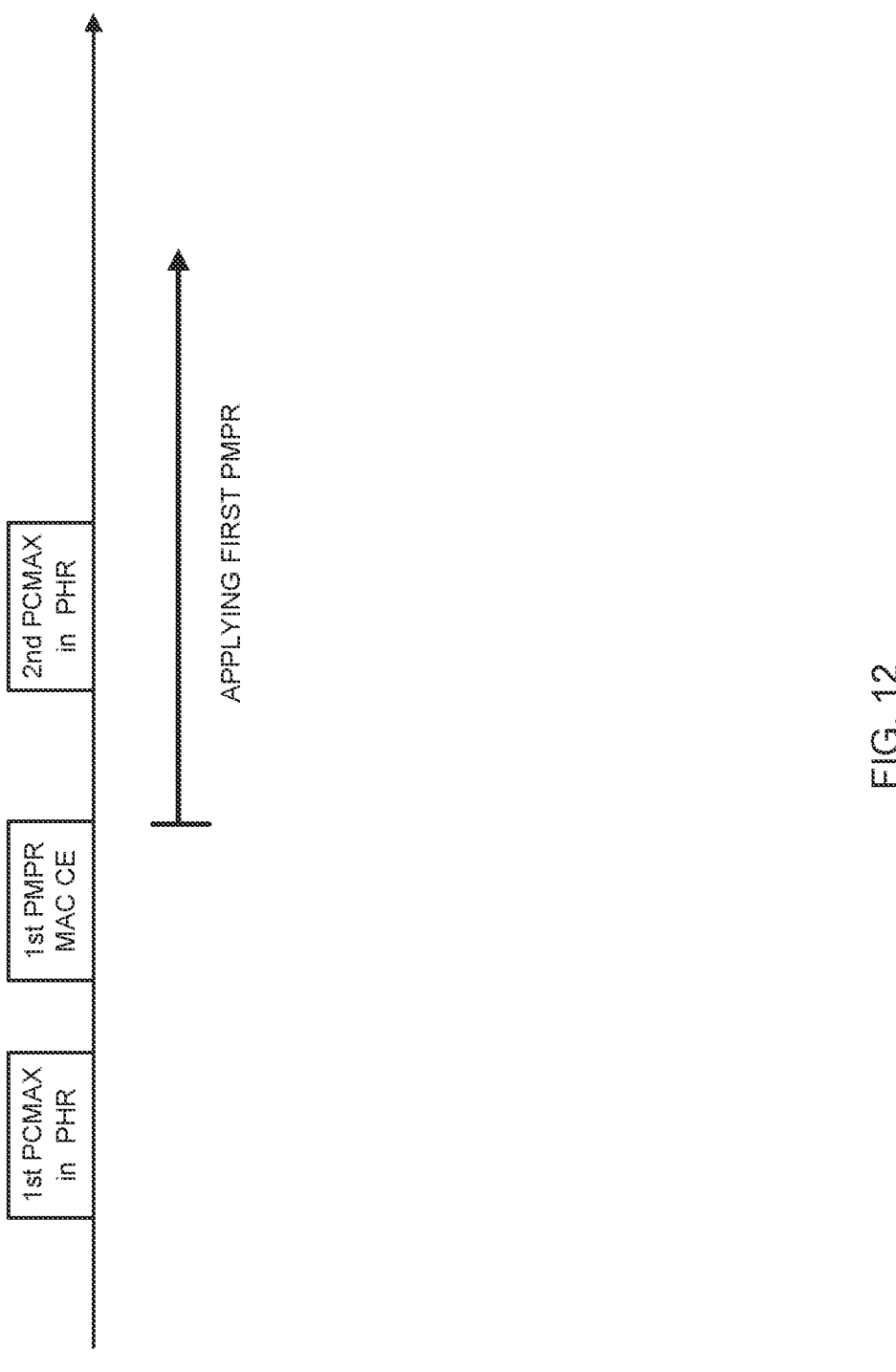
FIG. 12 is a diagram illustrating a second example in which the PMPR is applied to $P_{CMAX}$.

FIG. 12 is a diagram illustrating a second example in which the PMPR is applied to $P_{CMAX}$. In the example illustrated in FIG. 12, Option 3-2a and Option 4-1/5-1 are applied to the second $P_{CMAX}$. That is, the PMPR is applied after a specific period from the PMPR reporting, and the latest PMPR (first PMPR) reported before the PHR is applied to the second $P_{CMAX}$.

[PMPR Applied to $P_{CMAX}$ when Option 3-3 is Applied]

When Option 3-3 is applied, and Option 3-1 is indicated by "A", it is preferable to apply Option 4-3/5-3. In addition, when Option 3-3 is applied and Option 3-2a/3-2b is indicated by "A", it is preferable to apply Option 4-1/5-1.

According to the third embodiment, it is possible to appropriately indicate the PMPR to be applied to $P_{CMAX}$ in a case of reporting the PMPR by a new MAC CE independent of the PHR MAC CE.

<As for R>

As described above, "R" included in the MAC CE configuration example in each drawing indicates a reserved bit with which information notification is not made, but information notification may be made using "R". For example, "R" may indicate the presence or absence of information regarding the MPE in the present disclosure (e.g., P-MPR report).

"R" may be applied to beam information/RS information switching. For example, "R" may be applied to UL beam/RS or DL beam/RS switching and SSB/CSI-RS switching.

"R" may be applied to switching between multiple options (the embodiments, aspects, MAC CE configuration examples, and the like) in the present disclosure. For example, "R" may be applied to switching of the number of bits (e.g., 2/4/5 bits) of the P-MPR in the MAC CE. In a case where two kinds of numbers of bits (e.g., two of 2/4/5 bits) are set/specified as the numbers of bits of the P-MPR, the number of bits may be switched using any one "R". In a case where three kinds of numbers of bits (e.g., 2/4/5 bits) are set/specified as the numbers of bits of the P-MPR, the number of bits may be switched using any two "R".

Notification of at least a part of information regarding an MPE problem beam may be made using "R". Notification of the presence or absence of the information regarding the MPE problem beam (the presence or absence of the information regarding the MPE problem beam in the MAC CE) may be made using "R".

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 13:
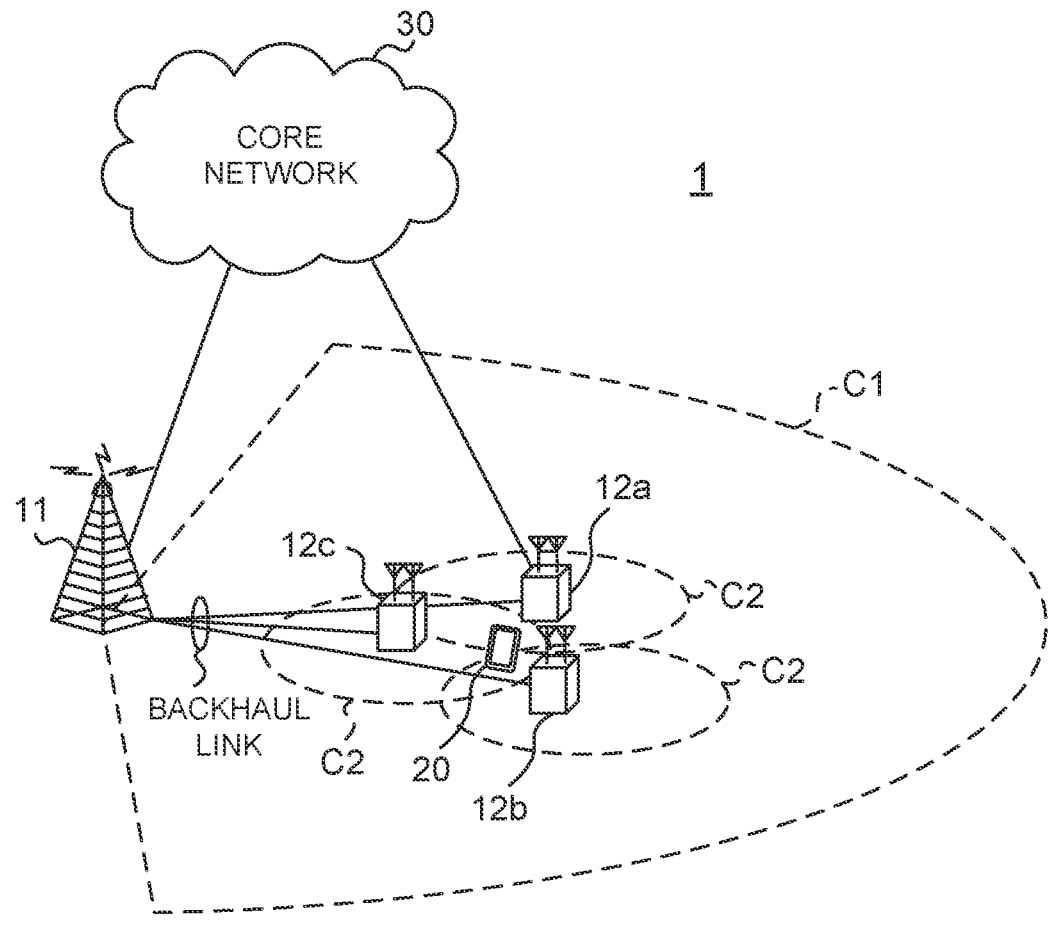
FIG. 13 is a diagram illustrating an example of a schematic configuration of a radio communication system according to one embodiment.

FIG. 13 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Furthermore, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is a MN, and an LTE (E-UTRA) base station (eNB) is an SN.

The radio communication system 1 may support dual connectivity between a plurality of base stations in the same RAT (e.g., dual connectivity in which both a MN and an SN are NR base stations (gNBs) (NR-NR dual connectivity (NN-DC)).

The radio communication system 1 may include a base station 11 that forms a macro cell C1 with a relatively wide coverage and base stations 12 (12a to 12c) that are arranged within the macro cell C1 and form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CCs) or dual connectivity (DC).

Each CC may be included in at least one of a first frequency range 1 (FR1) or a second frequency range 2 (FR2) The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and, for example, FR1 may correspond to a frequency range higher than FR2.

Furthermore, the user terminal 20 may perform communication in each CC using at least one of time division duplex (TDD) or frequency division duplex (FDD).

The plurality of base stations 10 may be connected by wire (e.g., an optical fiber or an X2 interface in compliance with common public radio interface (CPRI)) or wirelessly (e.g., NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), or next generation core (NGC).

The user terminal 20 may be a terminal supporting to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (e.g., another single carrier transmission method or another multi-carrier transmission method) may be used as the UL and DL radio access method.

In the radio communication system 1, as downlink channels, a downlink shared channel (physical downlink shared channel (PDSCH)) that is shared by respective user terminals 20, a broadcast channel (physical broadcast channel (PBCH)), a downlink control channel (physical downlink control channel (PDCCH)), or the like may be used.

Furthermore, in the radio communication system 1, as uplink channels, an uplink shared channel (physical uplink shared channel (PUSCH)) that is shared by respective user terminals 20, an uplink control channel (physical uplink control channel (PUCCH)), a random access channel (physical random access channel (PRACH)), or the like may be used.

User data, higher layer control information, the system information block (SIB), and the like are transmitted on the PDSCH. The PUSCH may transmit the user data, higher layer control information, and the like. Furthermore, the master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One search space may correspond to a PDCCH candidate corresponding to one or more aggregation levels. One or more search spaces may be referred to as a search space set. Note that "search space" and "search space set", "search space configuration" and "search space set configuration", and "CORESET" and "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RSs.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that the SS, the SSB, or the like may also be referred to as a reference signal.

Furthermore, in the radio communication system 1, a sounding reference signal (SRS), a demodulation reference signal (DMRS), and the like may be transmitted as an uplink reference signal (UL-RS). Note that, a DMRS may be referred to as a "user terminal-specific reference signal (UE-specific reference signal)".

(Base Station)

Figure 14:
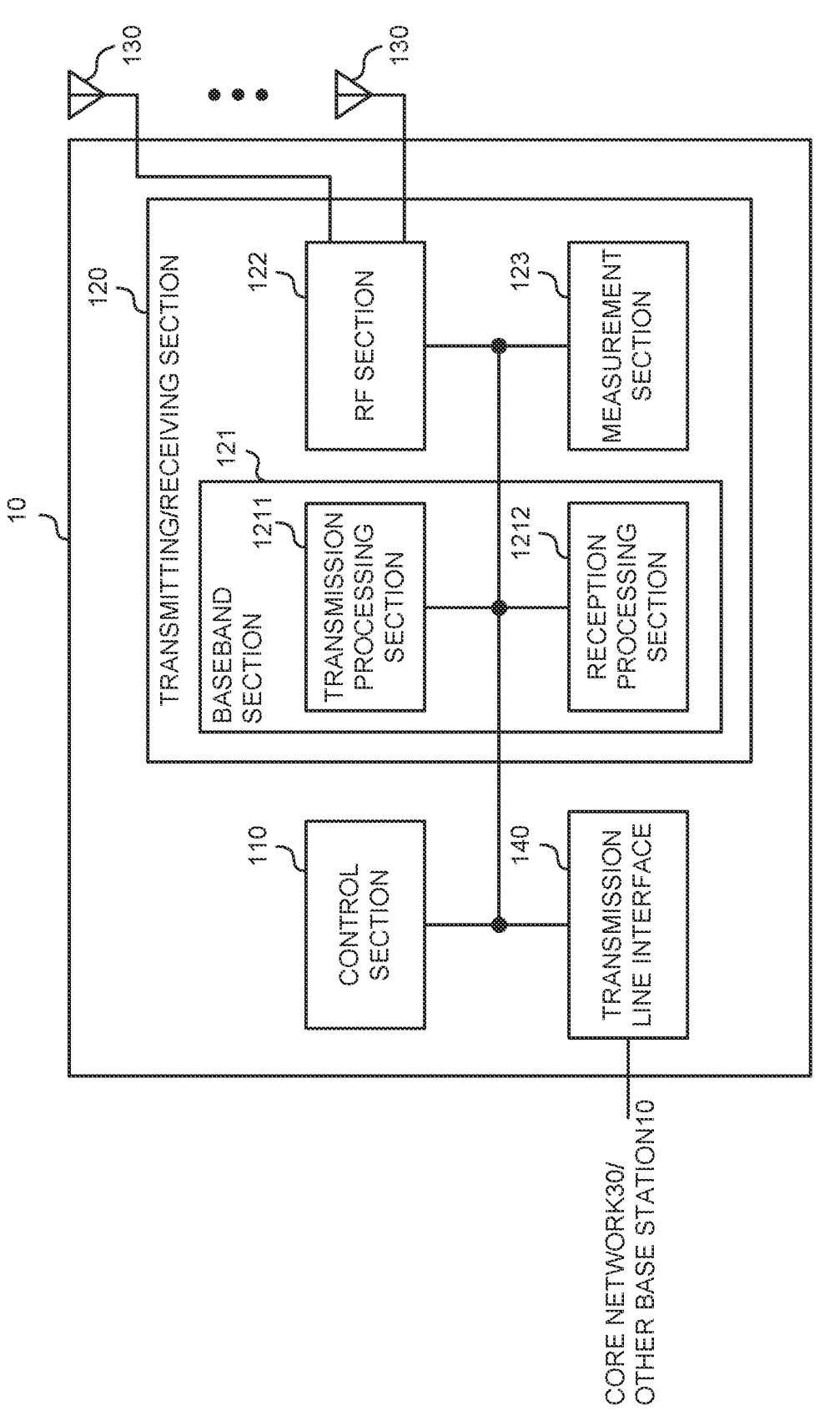
FIG. 14 is a diagram illustrating an example of a configuration of a base station according to one embodiment.

FIG. 14 is a diagram illustrating an example of a configuration of the base station according to one embodiment. The base station 10 includes a control section 110, a transmission/reception section 120, a transmitting/receiving antenna 130, and a transmission line interface 140. Note that one or more control sections 110, one or more transmission/reception sections 120, one or more transmitting/receiving antennas 130, and one or more transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be implemented by a controller, a control circuit, and the like that are described based on common recognition in the technical field related to the present disclosure.

The control section 110 may control signal generation, scheduling (e.g., resource allocation or mapping), and the like. The control section 110 may control transmission/reception, measurement, and the like using the transmission/reception section 120, the transmitting/receiving antenna 130, and the transmission line interface 140. The control section 110 may generate data to be transmitted as a signal, control information, a sequence, and the like, and may forward the data, the control information, the sequence, and the like to the transmission/reception section 120. The control section 110 may perform call processing (such as configuration or release) of a communication channel, management of the state of the base station 10, management of a radio resource, and the like.

The transmission/reception section 120 may include a baseband section 121, a radio frequency (RF) section 122, and a measurement section 123. The baseband section 121 may include a transmission processing section 1211 and a reception processing section 1212. The transmission/reception section 120 can be implemented by a transmitter/receiver, an RF circuit, a baseband circuit, a filter, a phase shifter, a measurement circuit, a transmission/reception circuit, and the like that are described based on common recognition in the technical field related to the present disclosure.

The transmission/reception section 120 may be configured as an integrated transmission/reception section or may be implemented by a transmission section and a reception section. The transmission section may be implemented by the transmission processing section 1211 and the RF section 122. The reception section may be implemented by the reception processing section 1212, the RF section 122, and the measurement section 123.

The transmitting/receiving antennas 130 can be implemented by antennas described based on common recognition in the technical field related to the present disclosure, for example, an array antenna.

The transmission/reception section 120 may transmit the above-described downlink channel, synchronization signal, downlink reference signal, and the like. The transmission/reception section 120 may receive the above-described uplink channel, uplink reference signal, and the like.

The transmission/reception section 120 may form at least one of a Tx beam or a reception beam by using digital beam forming (e.g., precoding), analog beam forming (e.g., phase rotation), and the like.

The transmission/reception section 120 (transmission processing section 1211) may perform packet data convergence protocol (PDCP) layer processing, radio link control (RLC) layer processing (e.g., RLC retransmission control), medium access control (MAC) layer processing (e.g., HARQ retransmission control), and the like, for example, on data or control information acquired from the control section 110 to generate a bit string to be transmitted.

The transmission/reception section 120 (transmission processing section 1211) may perform transmission processing such as channel coding (which may include error correction coding), modulation, mapping, filtering processing, discrete Fourier transform (DFT) processing (as necessary), inverse fast Fourier transform (IFFT) processing, precoding, or digital-analog conversion on the bit string to be transmitted and may output a baseband signal.

The transmission/reception section 120 (RF section 122) may perform modulation to a radio frequency band, filtering processing, amplification, and the like on the baseband signal and may transmit a signal in a radio frequency band via a transmitting/receiving antenna 130.

Meanwhile, the transmission/reception section 120 (RF section 122) may perform amplification, filtering processing, demodulation to a baseband signal, and the like on a signal in a radio frequency band received by a transmitting/receiving antenna 130.

The transmission/reception section 120 (reception processing section 1212) may apply, on the acquired baseband signal, reception processing such as analog-digital conversion, fast Fourier transform (FFT) processing, inverse discrete Fourier transform (IDFT) processing (as necessary), filtering processing, demapping, demodulation, decoding (which may include error correction decoding), MAC layer processing, RLC layer processing, or PDCP layer processing to acquire user data and the like.

The transmission/reception section 120 (measurement section 123) may perform measurement on the received signal. For example, the measurement section 123 may perform radio resource management (RRM), channel state information (CSI) measurement, and the like based on the received signal. The measurement section 123 may measure received power (e.g., reference signal received power (RSRP)), received quality (e.g., reference signal received quality (RSRQ), a signal to interference plus noise ratio (SINR), a signal to noise ratio (SNR)), signal strength (e.g., received signal strength indicator (RSSI)), propagation path information (e.g., CSI), and the like. The measurement result may be output to the control section 110.

The transmission line interface 140 may transmit/receive a signal (backhaul signaling) to and from an apparatus included in the core network 30, other base stations 10, and the like and may, for example, acquire or transmit user data (user plane data), control plane data, and the like for the user terminal 20.

Note that the transmission section and the reception section of the base station 10 in the present disclosure may be constituted by at least one of the transmission/reception section 120, the transmitting/receiving antenna 130, or the transmission line interface 140.

Note that the transmission/reception section 120 may receive a first medium access control-control element (MAC CE) including power-management maximum power reduction (PMPR) and a first value indicating an application timing of the PMPR, and receive an uplink (UL) signal transmitted based on the PMPR.

(User Terminal)

Figure 15:
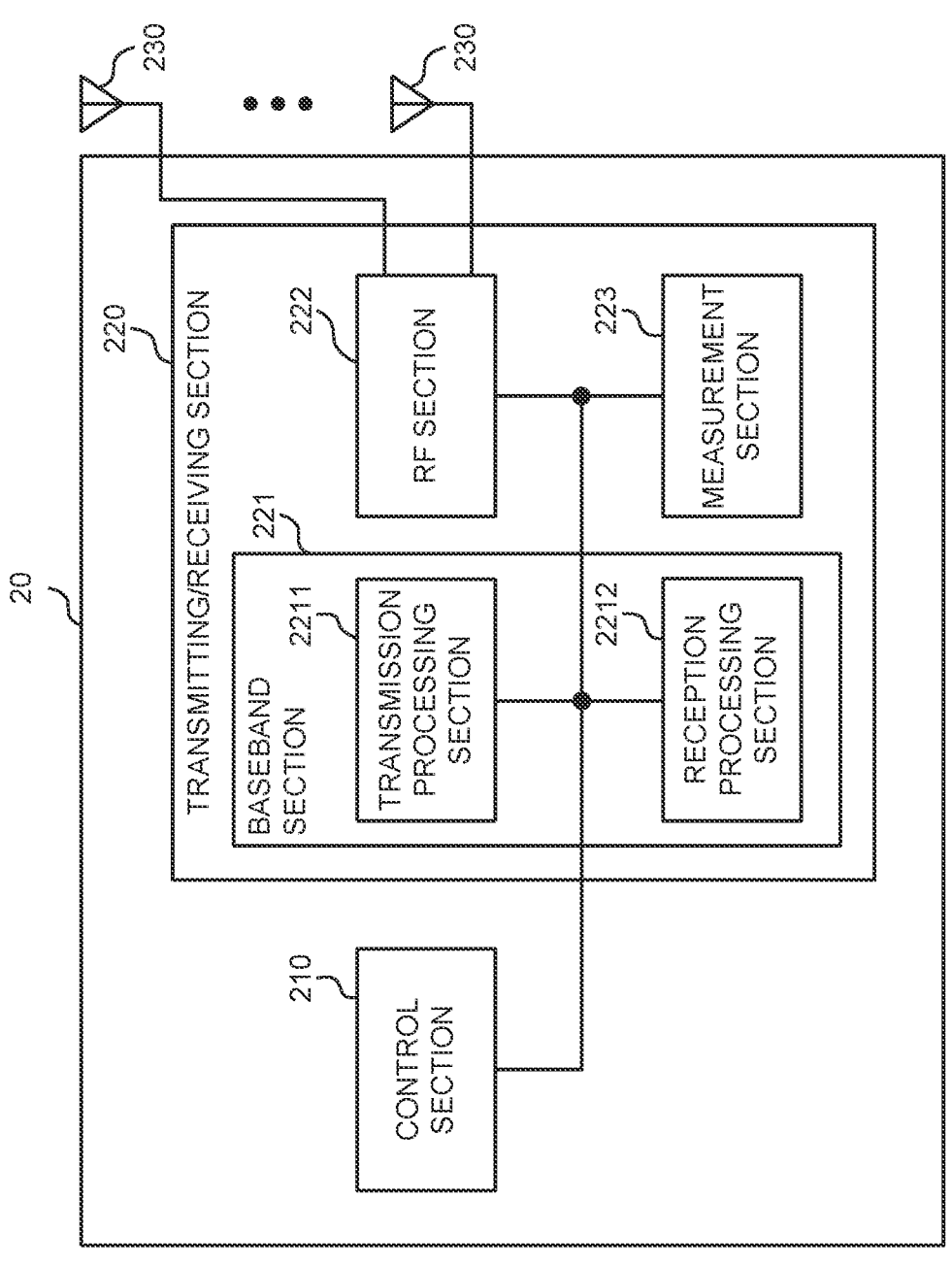
FIG. 15 is a diagram illustrating an example of a configuration of a user terminal according to one embodiment.

FIG. 15 is a diagram illustrating an example of a configuration of the user terminal according to one embodiment. The user terminal 20 includes a control section 210, a transmission/reception section 220, and a transmitting/receiving antenna 230. Note that one or more of the control sections 210, one or more of the transmission/reception sections 220, and one or more of the transmitting/receiving antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can be implemented by a controller, a control circuit, and the like that are described based on common recognition in the technical field related to the present disclosure.

The control section 210 may control signal generation, mapping, and the like. The control section 210 may control transmission/reception, measurement, and the like using the transmission/reception section 220 and the transmitting/receiving antenna 230. The control section 210 may generate data to be transmitted as a signal, control information, a sequence, and the like, and may forward the data, the control information, the sequence, and the like to the transmission/reception section 220.

The transmission/reception section 220 may include a baseband section 221, an RF section 222, and a measurement section 223. The baseband section 221 may include a transmission processing section 2211 and a reception processing section 2212. The transmission/reception section 220 can be implemented by a transmitter/receiver, an RF circuit, a baseband circuit, a filter, a phase shifter, a measurement circuit, a transmitting/receiving circuit, and the like that are described based on common recognition in the technical field related to the present disclosure.

The transmission/reception section 220 may be configured as an integrated transmission/reception section, or may be implemented by a transmission section and a reception section. The transmission section may be implemented by the transmission processing section 2211 and the RF section 222. The reception section may be implemented by the reception processing section 2212, the RF section 222, and the measurement section 223.

The transmitting/receiving antenna 230 can be implemented by an antenna that is described based on common recognition in the technical field related to the present disclosure, for example, an array antenna or the like.

The transmission/reception section 220 may receive the above-described downlink channel, synchronization signal, downlink reference signal, and the like. The transmission/reception section 220 may transmit the above-described uplink channel, uplink reference signal, and the like.

The transmission/reception section 220 may form at least one of a Tx beam or a reception beam by using digital beam forming (e.g., precoding), analog beam forming (e.g., phase rotation), and the like.

The transmission/reception section 220 (transmission processing section 2211) may perform PDCP layer processing, RLC layer processing (e.g., RLC retransmission control), MAC layer processing (e.g., HARQ retransmission control), and the like, for example, on data, control information, and the like acquired from the control section 210, to generate a bit string to be transmitted.

The transmission/reception section 220 (transmission processing section 2211) may perform transmission processing such as channel coding (which may include error correction coding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a certain channel (e.g., PUSCH), the transmission/reception section 220 (transmission processing section 2211) may perform DFT processing as the transmission processing in order to transmit the channel using a DFT-s-OFDM waveform. In a case where it is not the case, DFT processing need not be performed as the transmission processing.

The transmission/reception section 220 (RF section 222) may perform modulation to a radio frequency range, filtering processing, amplification, and the like on the baseband signal, to transmit a signal in the radio frequency range via the transmitting/receiving antenna 230.

Meanwhile, the transmission/reception section 220 (RF section 222) may perform amplification, filtering processing, demodulation to a baseband signal, and the like on the signal in the radio frequency range received by the transmitting/receiving antenna 230.

The transmission/reception section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmission/reception section 220 (measurement section 223) may perform measurement on the received signal. For example, the measurement section 223 may perform RRM measurement, CSI measurement, and the like based on the received signal. The measurement section 223 may measure received power (e.g., RSRP), received quality (e.g., RSRQ, SINR, or SNR), signal strength (e.g., RSSI), propagation path information (e.g., CSI), and the like. The measurement result may be output to the control section 210.

Note that the transmission section and the reception section of the user terminal 20 in the present disclosure may include at least one of the transmission/reception section 220 or the transmitting/receiving antenna 230.

Note that the transmission/reception section 220 may transmit the first medium access control-control element (MAC CE) including the power-management maximum power reduction (PMPR) and the first value indicating the application timing of the PMPR. The control section 210 may control transmission of the uplink (UL) signal based on the PMPR.

The first MAC CE may include a power headroom, and the first value may indicate whether the PMPR in the first MAC CE has already been applied or the PMPR is applied after the transmission of the first MAC CE.

The first MAC CE may include a power headroom and include a second value indicating whether or not the PMPR exists in the first MAC CE.

The transmission/reception section 220 may transmit the second MAC CE including a power headroom. The first MAC CE does not include the power headroom, and the second MAC CE may include a third value indicating which of PMPR transmitted before the transmission of the second MAC CE, PMPR transmitted simultaneously with the trans-mission of the second MAC CE, and PMPR transmitted after the transmission of the second MAC CE is applied.
(Hardware Configuration)

Note that the block diagrams that have been used to describe the above embodiments illustrate blocks in func-tional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional blocks may be imple-mented by combining software with the above-described single apparatus or the above-described plurality of appara-tuses.

Here, the function includes, but is not limited to, deter-mining, judging, calculating, computing, processing, deriv-ing, investigating, searching, ascertaining, receiving, trans-mitting, outputting, accessing, solving, selecting, choosing, establishing, comparing, assuming, expecting, regarding, broadcasting, notifying, communicating, forwarding, con-figuring, reconfiguring, allocating, mapping, assigning, and the like. For example, a functional block (component) that has a transmission function may be referred to as a trans-mission section (transmitting unit), a transmitter, and the like. In any case, as described above, the implementation method is not particularly limited.

Figure 16:
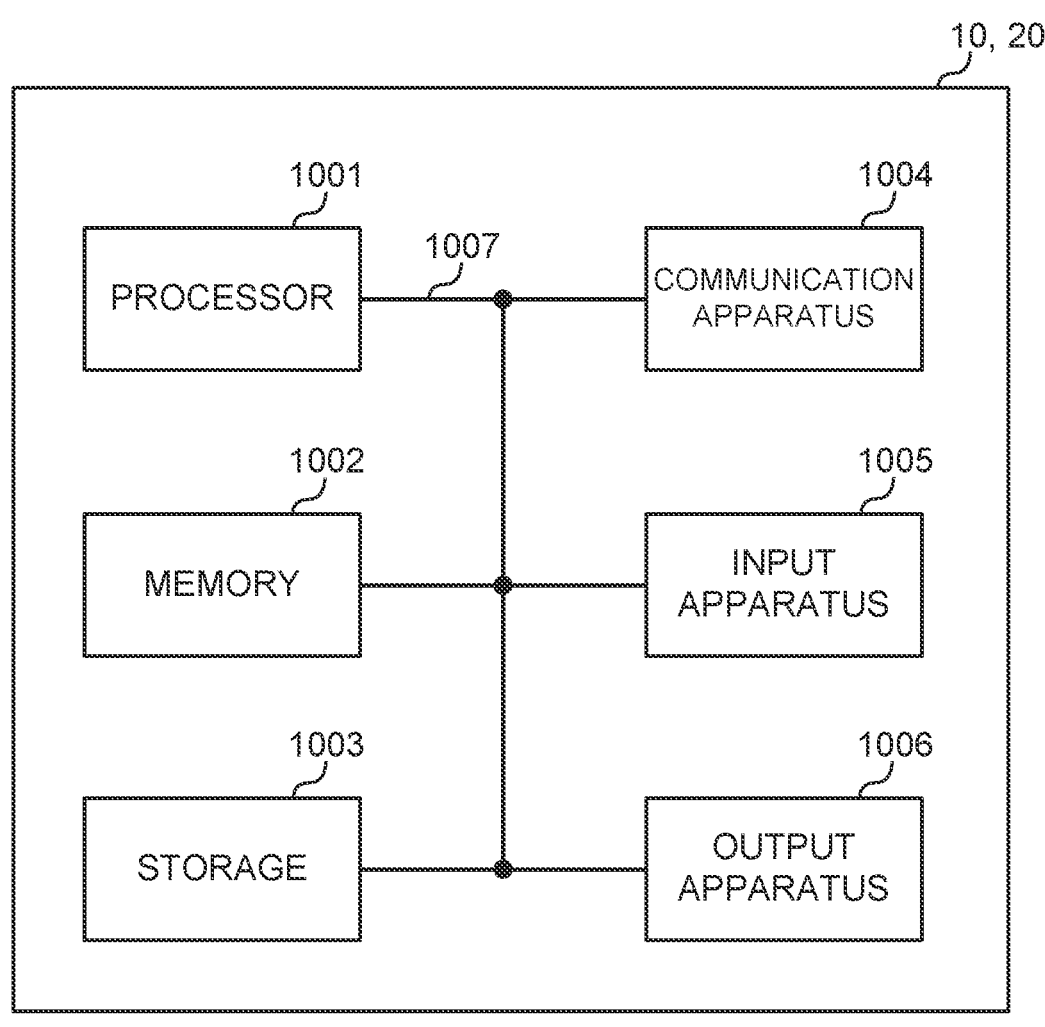
FIG. 16 is a diagram illustrating an example of a hardware configuration of the base station and the user terminal according to one embodiment.

For example, the base station, the user terminal, and the like in one embodiment of the present disclosure may function as a computer that performs the processing of the radio communication method of the present disclosure. FIG. 16 is a diagram illustrating an example of a hardware configuration of the base station and the user terminal according to one embodiment. Physically, the above-de-scribed base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, and a unit can be read as interchangeable with each other. The hardware configuration of the base station 10 and the user terminal 20 may be designed to include one or more of the apparatuses illustrated in the drawings, or may be designed not to include some apparatuses.

For example, although only one processor 1001 is illus-trated, a plurality of processors may be included. Further, the processing may be performed by one processor, or the processing may be performed by two or more processors simultaneously or sequentially, or using other methods. The processor 1001 may be implemented by one or more chips.

Each function of the base station 10 and the user terminal 20 is implemented by predetermined software (program) being read on hardware such as the processor 1001 and the memory 1002, by which the processor 1001 performs opera-tions, controlling communication via the communication apparatus 1004, and controlling at least one of reading or writing of data at the memory 1002 and the storage 1003.

The processor 1001 controls the entire computer by, for example, operating an operating system. The processor 1001 may be configured by a central processing unit (CPU) including an interface with peripheral equipment, a control apparatus, an operation apparatus, a register, and the like. For example, at least a part of the above-described control section 110 (210), transmission/reception section 120 (220), and the like may be implemented by the processor 1001.

The processor 1001 reads programs (program codes), software modules, data, etc. from at least one of the storage 1003 or the communication apparatus 1004 into the memory 1002, and performs various types of processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store programs (program codes), software modules, etc. that are executable for implementing the radio communication method according to one embodi-ment of the present disclosure.

The storage 1003 is a computer-readable recording medium, and may include, for example, at least one of a flexible disk, a floppy (registered trademark) disk, a mag-neto-optical disk (e.g., a compact disc ROM (CD-ROM) and the like), a digital versatile disk, a Blu-ray (registered trademark) disk), a removable disk, a hard disk drive, a smart card, a flash memory device (e.g., a card, a stick, or a key drive), a magnetic stripe, a database, a server, or other appropriate storage media. The storage 1003 may be referred to as a "secondary storage apparatus".

The communication apparatus 1004 is hardware (trans-mission/reception device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmission/reception section 120 (220), the transmitting/receiving antenna 130 (230), and the like described above may be implemented by the communication apparatus 1004. The transmission/reception section 120 (220) may be implemented by physically or logically separating the transmission section 120a (220a) and the reception section 120b (220b) from each other.

The input apparatus 1005 is an input device for receiving input from the outside (for example, a keyboard, a mouse, a microphone, a switch, a button, a sensor, and the like). The output apparatus 1006 is an output device that performs output to the outside (e.g., a display, a speaker, a light emitting diode (LED) lamp, or the like). Note that the input apparatus 1005 and the output apparatus 1006 may be an integrated configuration (e.g., touch panel).

The apparatuses such as the processor 1001 and the memory 1002 are connected by a bus 1007 for communicating information. The bus 1007 may be formed using a single bus, or may be formed using different buses for different connections between the apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented using at least one of these pieces of hardware.

Modifications

Note that terms described in the present disclosure and terms necessary for understanding the present disclosure may be replaced with terms that have the same or similar meanings. For example, a channel, a symbol, and a signal (signal or signaling) may be read as interchangeable with each other. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may be comprised of one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, or specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Also, the slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or a PUSCH) transmitted using a mini slot may be referred to as PDSCH (PUSCH) mapping type B.

A radio frame, a subframe, a slot, a mini slot, and a symbol each represent a time unit in signal transmission. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe or the TTI may be a subframe (1 ms) in the existing LTE, may be a period shorter than 1 ms (e.g., one to thirteen symbols), or may be a period longer than 1 ms. Note that a unit representing a TTI may be referred to as a slot, a mini slot, or the like instead of a subframe.

Here, a TTI refers to, for example, a minimum time unit of scheduling in radio communication. For example, in the LTE system, a base station performs scheduling to allocate radio resources (a frequency bandwidth, transmit power, and the like that can be used in each user terminal) to each user terminal in TTI units. Note that the definition of a TTI is not limited to this.

A TTI may be a transmission time unit of a channel-coded data packet (transport block), a code block, a codeword, etc. or may be a processing unit of scheduling, link adaptation, etc. When a TTI is given, a time interval (e.g., the number of symbols) to which a transport block, a code block, a codeword, or the like is actually mapped may be shorter than the TTI.

When one slot or one mini slot is referred to as a TTI, one or more TTIs (that is, one or more slots or one or more mini slots) may be a minimum time unit of scheduling. The number of slots (the number of mini slots) constituting the minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

A long TTI (such as a normal TTI or a subframe) may be replaced with a TTI having a duration exceeding 1 ms. A short TTI (such as a shortened TTI) may be replaced with a TTI having a TTI length less than the TTI length of a long TTI and more than or equal to 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in an RB may be determined based on a numerology.

An RB may include one or more symbols in the time domain, and may have a length of one slot, one mini slot, one subframe, or one TTI. One TTI, one subframe, etc. may each be comprised of one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource domain of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. PRBs may be defined in a BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE does not have to expect transmission/reception of a predetermined signal/channel outside the active BWP. Note that "cell", "carrier", etc. in the present disclosure may be replaced with "BWP".

Note that the structures of radio frames, subframes, slots, mini slots, symbols, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

The information, parameters, etc. described in the present disclosure may be represented using absolute values, or may be represented using relative values with respect to predetermined values, or may be represented using other corresponding information. For example, a radio resource may be specified by a predetermined index.

The names used for parameters etc. in the present disclosure are in no respect limiting. Furthermore, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, etc. described in the present disclosure may be represented using any of a variety of different technologies. For example, data, an instruction, a command, information, a signal, a bit, a symbol, a chip, etc., which may be referred to throughout the above description, may be represented by a voltage, a current, an electromagnetic wave, a magnetic field or a magnetic particle, an optical field or an optical photon, or any combination of these.

Information, signals, etc. can be output in at least one of a direction from a higher layer to a lower layer or a direction from a lower layer to a higher layer. Information, signals, etc. may be input and output via a plurality of network nodes.

Input and output information, signals, etc. may be stored in a specific location (e.g., memory), or may be managed using a control table. The information, signals, and the like to be input and output can be overwritten, updated, or appended. The output information, signals, and the like may be deleted. Information, signals, etc. that have been input may be transmitted to another apparatus.

Notification of information may be performed not only by using the aspects/embodiments described in the present disclosure but also using another method. For example, the notification of information in the present disclosure may be performed by using physical layer signaling (e.g., downlink control information (DCI) or uplink control information (UCI)), higher layer signaling (e.g., radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message and the like. Further, notification of the MAC signaling may be performed using, for example, an MAC control element (CE).

Also, reporting of predetermined information (for example, reporting of information to the effect that "X holds") does not necessarily have to be sent explicitly, and can be sent implicitly (for example, by not reporting this piece of information, by reporting another piece of information, and the like).

Determination may be performed using a value represented by one bit (0 or 1), or may be performed using a Boolean represented by true or false, or may be performed by comparing numerical values (e.g., comparison with a predetermined value).

Software, regardless of whether it is referred to as software, firmware, middleware, microcode, or a hardware description language, or referred to by another name, should be interpreted broadly to mean a command, a command set, a code, a code segment, a program code, a program, a subprogram, a software module, an application, a software application, a software package, a routine, a subroutine, an object, an executable file, an execution thread, a procedure, a function, etc.

Moreover, software, commands, information, and the like may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (e.g., a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (e.g., three) cells. In a case where the base station accommodates a plurality of cells, the entire coverage area of the base station can be partitioned into a plurality of smaller areas, and each smaller area can provide communication services through a base station subsystem (e.g., small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, mobile unit, subscriber station, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station or mobile station may be called as a transmission apparatus, a reception apparatus, a wireless communication apparatus, and the like. Note that at least one of the base station or the mobile station may be a device mounted on a moving body, a moving body itself, and the like. The moving body may be a transportation (e.g., a car, an airplane, or the like), an unmanned moving body (e.g., a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be read as interchangeable with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be read as interchangeable with terms corresponding to communication between terminals (e.g., "side"). For example, an uplink channel, a downlink channel, etc. may be replaced with a side channel.

Likewise, a user terminal in the present disclosure may be replaced with a base station. In this case, the base station 10 may have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, the methods described in the present disclosure have presented various step elements using an exemplary order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (e.g., a combination of LTE or LTE-A and 5G, and the like).

The phrase "based on" as used in the present disclosure does not mean "based only on", unless otherwise specified. In other words, the phrase "based on" means both "based only on" and "based at least on".

All references to the elements using designations such as "first" and "second" as used in the present disclosure do not generally limit the amount or sequence of these elements. These designations can be used in the present disclosure, as a convenient way of distinguishing between two or more elements. Thus, references to first and second elements do not mean that only the two elements can be employed, or that the first element must precede the second element in some form.

The term "determining" as used in the present disclosure may include a wide variety of operations. For example, "determining" may be regarded as "determining" judging, calculating, computing, processing, deriving, investigating, looking up (or searching or inquiring) (for example, looking up in a table, database, or another data structure), ascertaining, and the like.

Furthermore, "determining" may be regarded as "determining" receiving (e.g., receiving information), transmitting (e.g., transmitting information), inputting, outputting, accessing (e.g., accessing data in memory), and the like.

Moreover, "determining" may be interpreted as "determining" resolving, selecting, choosing, establishing, comparing, and the like. That is, "determining" may be interpreted as "determining" some action.

In addition, "determining" may be replaced with "assuming", "expecting", "considering", or the like.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the terms "A and B are different" may mean "A and B are different from each other". Note that the phrase may mean that "A and B are different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as "a", "an", and "the" in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

The invention claimed is:

1. A terminal comprising:
a transmitter that transmits a single entry Power Headroom Report Medium Access Control Control Element (PHR MAC CE) or a multiple entry PHR MAC CE, including first information indicating Power Management Maximum Power Reduction (P-MPR) specific to a beam, second information indicating whether the first information is present, and an ID for identifying the beam; and
a processor that controls transmission of an uplink (UL) signal based on the P-MPR,
wherein when the P-MPR is equal to or higher than a threshold, the single entry PHR MAC CE and the multiple entry PHR MAC CE include the first information,
wherein the single entry PHR MAC CE includes a single entry indicator field of the second information that indicates whether a field of the first information indicating the P-MPR specific to the beam is present in the single entry PHR MAC CE, and
wherein the multiple entry PHR MAC CE includes a multiple entry indicator field of the second information that indicates whether a field of the first information indicating the P-MPR is present in a same entry.

2. A radio communication method for a terminal, comprising:
transmitting a single entry Power Headroom Report Medium Access Control Control Element (PHR MAC CE) or a multiple entry PHR MAC CE, including first information indicating Power Management Maximum Power Reduction (P-MPR) specific to a beam, second information indicating whether the first information is present; and
controlling transmission of an uplink (UL) signal based on the P-MPR,
wherein when the P-MPR is equal to or higher than a threshold, the single entry PHR MAC CE and the multiple entry PHR MAC CE include the first information,
wherein the single entry PHR MAC CE includes a single entry indicator field of the second information that indicates whether a field of the first information indicating the P-MPR specific to the beam is present in the single entry PHR MAC CE, and
wherein the multiple entry PHR MAC CE includes a multiple entry indicator field of the second information that indicates whether a field of the first information indicating the P-MPR is present in a same entry.

3. A base station, comprising:
a receiver that receives a single entry Power Headroom Report Medium Access Control Control Element (PHR MAC CE) or a multiple entry PHR MAC CE, including first information indicating Power Management Maximum Power Reduction (P-MPR) specific to a beam, second information indicating whether the first information is present, and an ID for identifying the beam; and
a processor that controls reception of an uplink (UL) signal transmitted based on the P-MPR,
wherein when the P-MPR is equal to or higher than a threshold, the single entry PHR MAC CE and the multiple entry PHR MAC CE include the first information,
wherein the single entry PHR MAC CE includes a single entry indicator field of the second information that indicates whether a field of the first information indicating the P-MPR specific to the beam is present in the single entry PHR MAC CE, and
wherein the multiple entry PHR MAC CE includes a multiple entry indicator field of the second information that indicates whether a field of the first information indicating the P-MPR is present in a same entry.

4. A system comprising a terminal and a base station,
wherein the terminal comprises:
a transmitter that transmits a single entry Power Headroom Report Medium Access Control Control Element (PHR MAC CE) or a multiple entry PHR MAC CE, including first information indicating Power Management Maximum Power Reduction (P-MPR) specific to a beam, second information indicating whether the first information is present, and an ID for identifying the beam; and
a processor that controls transmission of an uplink (UL) signal based on the P-MPR,
wherein when the P-MPR is equal to or higher than a threshold, the single entry PHR MAC CE and the multiple entry PHR MAC CE include the first information,
wherein the single entry PHR MAC CE includes a single entry indicator field of the second information that indicates whether a field of the first information indicating the P-MPR specific to the beam is present in the single entry PHR MAC CE, and
wherein the multiple entry PHR MAC CE includes a multiple entry indicator field of the second information that indicates whether a field of the first information indicating the P-MPR is present in a same entry, and the base station comprises:

a receiver that receives the single entry PHR MAC CE or the multiple entry PHR MAC CE; and a processor that controls reception of the UL signal.

\* \* \* \* \*